United States Patent
Esaki et al.

(10) Patent No.: US 8,221,865 B2
(45) Date of Patent: Jul. 17, 2012

(54) OPTICAL RECORDING MEDIUM

(75) Inventors: Akira Esaki, Yokohama (JP); Yuuki Ono, Yokohama (JP); Yuuji Soejima, Yokkaichi (JP); Kentarou Uchino, Yokkaichi (JP); Makoto Terauchi, Yokkaichi (JP); Takeshi Kuriwada, Minato-ku (JP)

(73) Assignee: Mitsubishi Kagaku Media Co., Ltd., Tokyo (JP)

( * ) Notice: Subject to any disclaimer, the term of this patent is extended or adjusted under 35 U.S.C. 154(b) by 388 days.

(21) Appl. No.: 12/595,836

(22) PCT Filed: Aug. 20, 2008

(86) PCT No.: PCT/JP2008/064843
§ 371 (c)(1), (2), (4) Date: Oct. 14, 2009

(87) PCT Pub. No.: WO2009/025302
PCT Pub. Date: Feb. 26, 2009

(65) Prior Publication Data
US 2010/0055377 A1    Mar. 4, 2010

(30) Foreign Application Priority Data

Aug. 22, 2007 (JP) .................. 2007-215933
Aug. 22, 2007 (JP) .................. 2007-215934
Aug. 22, 2007 (JP) .................. 2007-216256

(51) Int. Cl.
B32B 3/02    (2006.01)

(52) U.S. Cl. .............. 428/64.1; 428/64.4; 430/270.11

(58) Field of Classification Search .............. 428/64.4; 430/270.11
See application file for complete search history.

(56) References Cited

U.S. PATENT DOCUMENTS

| | | |
|---|---|---|
| 2004/0013976 A1 | 1/2004 | Fujimoto et al. |
| 2005/0118380 A1 | 6/2005 | Hirata et al. |
| 2006/0166140 A1 | 7/2006 | Fujmoto et al. |
| 2006/0167200 A1 | 7/2006 | Fujimoto et al. |
| 2008/0102262 A1 | 5/2008 | Esaki et al. |

FOREIGN PATENT DOCUMENTS

| | | |
|---|---|---|
| JP | 61-190736 | 8/1986 |
| JP | 4-254927 | 9/1992 |

(Continued)

OTHER PUBLICATIONS

Extended European Search Report issued Mar. 4, 2011, in European Application No. 08827991.4.

*Primary Examiner* — Elizabeth Mulvaney
(74) *Attorney, Agent, or Firm* — Oblon, Spivak, McClelland, Maier & Neustadt, L.L.P.

(57) ABSTRACT

To provide an optical recording medium excellent in the balance of characteristics, which has a sufficient surface hardness and of which the deformation when the environmental temperature and the environmental humidity change is small. An optical recording medium comprising a resin substrate, a recording and reading layer, a cover coat layer which is a cured product of a radiation-curable composition containing a urethane (meth)acrylate (A) and a (meth)acrylate compound (B) other than the urethane (meth)acrylate (A), and a hard coat layer having a surface hardness of at least B in this order, wherein of the cover coat layer, the ratio of the elastic modulus in tension upon absorbing water to saturation to the elastic modulus in tension at 25° C. under a humidity of 45% is at least 0.20.

12 Claims, 3 Drawing Sheets

System of measuring the disc deformation relative to the temperature

FOREIGN PATENT DOCUMENTS

| | | |
|---|---|---|
| JP | 10 330442 | 12/1998 |
| JP | 2002 245672 | 8/2002 |
| JP | 2003-119231 | 4/2003 |
| JP | 2003-263780 | 9/2003 |
| JP | 2004 299263 | 10/2004 |
| JP | 2006-241234 | 9/2006 |
| JP | 2007 80448 | 3/2007 |
| JP | 2007-131698 | 5/2007 |
| JP | 2007 169580 | 7/2007 |
| JP | 2007 204651 | 8/2007 |

System of measuring the disc deformation relative to the temperature

OPTICAL RECORDING MEDIUM

TECHNICAL FIELD

The present invention relates to an optical recording medium such as a recording/reading disc. More particularly, it relates to an optical recording medium capable of coping with a temperature change and a change in the environmental humidity and capable of being used for a high density optical disc, etc.

BACKGROUND ART

In recent years, optical recording media such as read-only discs and optical recording discs have been heavily used as an information recording medium which records or stores a large amount of information such as motion picture. As one example, a high density optical disc (so-called Blu-ray Disc, hereinafter sometimes referred to as "Blu-Ray Disc") which utilizes a laser beam at a wavelength of 400 nm has been proposed (Patent Document 1). The Blu-Ray Disc is an optical recording medium comprising a resin substrate, a recording and reading layer, a cover coat layer and a hard coat layer in this order. The hard coat layer is required to have abrasion resistance and hardness. On the other hand, a small deformation of the disc as a whole when the environmental temperature or the environmental humidity changes is required so that information can stably be read or write even when the environmental temperature or humidity changes.

Here, it is clear by studies by the present inventors that the deformation of the disc accompanying the environment temperature change is dominated by the elastic modulus of the cover coat layer. That is, the deformation of the disc accompanying the temperature change is significant when the elastic modulus of the cover coat layer is great. On the contrary, the deformation is small when the elastic modulus of the cover coat layer is small. Accordingly, the elastic modulus of the cover coat layer is preferably small in view of a small deformation accompanying the environment temperature change.

However, in general, the smaller the elastic modulus of the cover coat layer, the more the hardness of the hard coat layer formed on the cover coat layer decreases. Accordingly, in view of the hardness of the hard coat layer i.e. the abrasion resistance, the hardness, etc. of an optical recording medium, the elastic modulus of the cover coat layer is preferably great.

Further, it is estimated that the deformation of an optical recording medium accompanying the environment humidity change is dominated by the deformation accompanying absorption/desorption of water of the resin substrate. This is clear since the deformation of an optical recording medium comprising a resin substrate and a recording and reading layer alone is very large. Usually, the deformation can be reduced by further forming a cover coat layer and a hard coat layer on the recording and reading layer. It is considered that the deformation accompanying absorption/desorption of water of the cover coat layer and the hard coat layer offsets the deformation of the resin substrate present on the opposite side via the recording and reading layer, which is a relatively hard layer. It is considered that the degree of decreasing the deformation depends on a thick layer, and it mainly depends on the elastic modulus of the cover coat layer which is thicker than the hard coat layer in general. That is, an elastic modulus of the cover coat layer in a proper range (a relatively high elastic modulus) is favorable since the deformation of the disc accompanying the environmental humidity change is small. In a case where the elastic modulus of the cover coat layer is too low, the deformation accompanying absorption/desorption of water of the resin substrate by the environmental humidity change cannot sufficiently be suppressed and as a result, the deformation of the disc as a whole by the environmental humidity change is significant in some cases. Further, if the elastic modulus of the cover coat layer is too high, the deformation of the cover coat layer is more significant than the deformation of the resin substrate, and the deformation on the side opposite to the resin substrate is increased. Accordingly, in view of a small deformation accompanying the environmental humidity change, the elastic modulus of the cover coat layer is preferably within a proper range at a relatively high elastic modulus region.

With respect to the above-described relation between the elastic modulus of the cover coat layer and the required performance, in summary, (1) the cover coat layer preferably has a high elastic modulus in view of the surface hardness of the optical recording medium, (2) the cover coat layer preferably has a low elastic modulus in view of the deformation accompanying the environmental temperature change, and further, (3) the cover coat layer preferably has an elastic modulus within a proper range at a relatively high elastic modulus region in view of the deformation accompanying the environmental humidity change.

A material which undergoes a small deformation by the environmental temperature change (2) and the environmental humidity change (3) is proposed, for example, in Patent Document 1. The document discloses that a composition containing an urethane acrylate and another acrylate is suitable as a material for a light transmitting layer of an optical information medium, and according to studies by the present inventors, by use of the above material for a light transmitting layer, it may be possible to produce an optical recording medium of which the deformation accompanying the environmental temperature or humidity change is not so great.

Further, a material which has a high surface hardness (1) and of which the deformation by the environmental humidity change is small (3) is proposed, for example, in Patent Document 2.

Patent Document 1: JP-A-2003-263780
Patent Document 2: JP-A-2007-131698

DISCLOSURE OF THE INVENTION

Object to be Accomplished by the Invention

However, in the case of an optical recording medium using the material for a light transmitting layer disclosed in Patent Document 1, (1) the surface hardness cannot be sufficient in some cases. Further, in the case of an optical recording medium using the material disclosed in Patent Document 2, it became clear by studies by the present inventors that a deformation may occur by the environmental temperature change.

Further, no optical recording medium of which a deformation by the environmental temperature change is small (2) and which has a high surface hardness (1) has been reported. Accordingly, it has been desired to provide an optical recording medium which satisfies all the above requirements, i.e. an optical recording medium of which the deformation by the environmental temperature and environmental humidity changes is small and which further has a high surface hardness.

The present invention has been made to accomplish the above object. That is, it is an object of the present invention to provide an optical recording medium excellent in the balance of characteristics, which has a sufficient surface hardness and of which the deformation when the environmental temperature and the environmental humidity change is small.

Means to Accomplish the Object

The present inventors have conducted extensive studies on an optical recording medium capable of satisfying the above requirements and as a result, found that the material of a radiation-curable composition to form the cover coat layer and the elastic modulus of the cover coat layer upon absorbing water are important. Specifically, they have found it possible to obtain an optical recording medium of which the deformation when the environmental temperature changes and the deformation immediately after the environmental humidity changes are small, and which has a sufficient surface hardness, by the above cover coat layer containing a urethane (meth)acrylate (A) and another (meth)acrylate compound (B) and by the ratio of the elastic modulus of the cover coat layer upon absorbing water to the elastic modulus under normal conditions being a predetermined value or above, and accomplished the present invention.

That is, the present invention provides the following:

An optical recording medium comprising a resin substrate, a recording and reading layer, a cover coat layer which is a cured product of a radiation-curable composition containing a urethane (meth)acrylate (A) and a (meth)acrylate compound (B) other than the urethane (meth)acrylate (A), and a hard coat layer having a surface hardness of at least B in this order, wherein of the cover coat layer, the ratio of the elastic modulus in tension upon absorbing water to saturation to the elastic modulus in tension at 25° C. under a humidity of 45% is at least 0.20.

In the above optical recording medium, the water absorption of the cover coat layer is preferably at most 2 (wt/wt) % at 25° C.

Further, with respect to the optical recording medium after left at rest in an environment at 25° C. for a certain time and then left at rest in an environment at 5° C. for one hour, and the optical recording medium after left at rest in an environment at 25° C. for a certain time and then left at rest in an environment at 55° C. for one hour, when the displacement amount in the direction vertical to the surface of the resin substrate at a position farthest from the center in the recording and reading region of each optical recording medium is measured, the displacement amount is preferably at most 150 μm.

Further, the (meth)acrylate compound (B) other than the urethane (meth)acrylate (A) is preferably a monofunctional (meth)acrylate (b1) and/or a multifunctional (meth)acrylate (b2).

Further, it is preferred that the surface hardness of the hard coat layer is at least HB, the cover coat layer is a cured product of a radiation-curable composition containing the urethane (meth)acrylate (A) which is a reaction product of a composition containing a polyisocyanate (a1), a diol (a2) having a molecular weight less than 400, a polyol (a3) having a molecular weight of at least 400 and a hydroxyl group-containing (meth)acrylate (a4), and the monofunctional (meth)acrylate (b1) and the multifunctional (meth)acrylate (b2), the elastic modulus upon absorbing water to saturation of the cover coat layer is within a range of from 200 MPa to 1,100 MPa, and the thickness of the cover coat layer is within a range of from 70 μm to 105 μm.

Here, it is preferred that the cover coat layer is a cured product of a radiation-curable composition containing the urethane (meth)acrylate (A), the monofunctional (meth)acrylate (b1) and the multifunctional (meth)acrylate (b2), and contents of the respective components are such that (A): 10 to 85 wt %, (b1): 10 to 80 wt %, and (b2): 0 to 30 wt %.

Further, it is preferred that the polyol (a3) having a molecular weight of at least 400 comprises a polyol (a3-2) having a molecular weight of at least 400 and less than 1,500 and a polyol (a3-1) having a molecular weight of at least 1,500.

Further, it is preferred that the polyol (a3) having a molecular weight of at least 400 is a polyether polyol.

Further, it is preferred that the diol (a2) having a molecular weight less than 400 is a diol having two hydroxyl groups connected by carbon.

Further, it is preferred that the monofunctional (meth)acrylate (b1) and/or the multifunctional (meth)acrylate (b2) is an alicyclic (meth)acrylate, and it is preferred that the multifunction (meth)acrylate (b2) is an aliphatic multifunction (meth)acrylate.

Further, the optical recording medium of the present invention can be used as a Blu-Ray Disc.

Effects of the Invention

According to the present invention, an optical recording medium excellent in the balance of characteristics, which has a sufficient surface hardness, and of which the deformation when the environmental temperature changes and the deformation immediately after the environmental humidity changes are small.

BEST MODE FOR CARRYING OUT THE INVENTION

Figure 1:
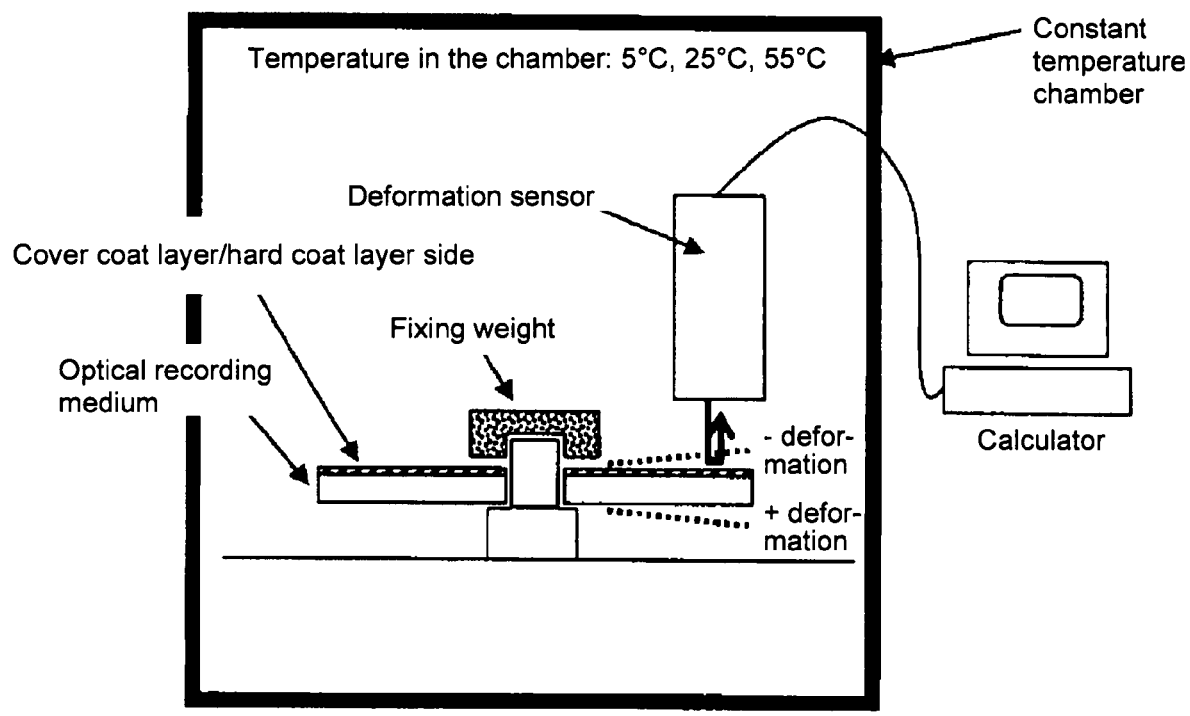
FIG. 1 is a diagram schematically illustrating the system of a test to evaluate the disc deformation relative to the temperature.

Now, the present invention will be described in detail below. However, the present invention is by no means restricted to the following embodiments, and the present invention can be carried out in a variety of modification forms within the scope of the invention.

The present invention relates to an optical recording medium such as a recording/reading disc, and the optical recording medium of the present invention comprises a resin substrate, a recording and reading layer, a cover coat layer which is a cured product of a radiation-curable composition containing a urethane (meth)acrylate (A) and a (meth)acrylate compound (B) other than the urethane (meth)acrylate (A), and a hard coat layer having a surface hardness of at least B in this order. In the present invention, a (meth)acrylate means an acrylate and/or a methacrylate.

Further, the optical recording medium of the present invention is characterized in that the ratio e (hereinafter sometimes referred to as "elastic modulus in tension ratio") of the elastic modulus in tension upon absorbing water to saturation of the cover coat layer to the elastic modulus in tension at 25° C. under a humidity of 45%, represented by the following formula, is at least 0.20.

$e$=(elastic modulus in tension upon absorbing water to saturation)/(elastic modulus in tension at 25° C. under 45% RH)

The elastic modulus in tension means an elastic modulus when a tensile test is carried out with a 0.1 mm thickness film using a tensile strength tester at a rate of pulling of 1 mm/min. Further, the elastic modulus upon absorbing water to saturation in the present invention means an elastic modulus when the above tensile strength test is carried out with respect to the above film immediately after immersed in water at 25° C. for 3 hours.

It is possible to measure the above elastic modulus and the water absorption of the cover coat layer in the present invention from a finished product as an optical recording medium by the following method.

In the case of a conventional optical recording medium, a portion comprising the cover coat layer and the outside thereof can relatively easily be peeled in a disc form at the interface between the cover coat layer and the recording and reading layer. In a case where another layer, for example, a resin layer such as a hard coat layer is formed on the cover coat layer, although it is difficult to separate both the layers, it is possible to know how thick another layer laminated is by a method of scanning electron microscope (SEM) observation, micro-FT-IR (Fourier transform infrared spectroscopy) measurement or the like with respect to the cross section of the peeled layers. After the layer thickness is known, a layer which is difficult to peel is removed by using, for example, a rotational grinder and then the cover coat layer portion is peeled. A film of the cover coat layer alone is obtained in such a manner and then the elastic modulus and the water absorption can be measured by the above measuring method.

When the composition of the cover coat layer is to be identified, it is possible to know the composition of the resin by analyzing the above obtained film of the cover coat layer alone by pyrolysis GC-MS (gas chromatography mass spectrometry) or the like.

According to the present invention, since the cover coat layer contains predetermined materials (the urethane (meth)acrylate (A) and the (meth)acrylate compound (B) other than the urethane (meth)acrylate (A)), the optical recording medium can have a high surface hardness and its deformation by the environmental temperature can be made small.

The reason why favorable surface hardness and environmental temperature resistance can be achieved is not necessarily clear, but it is estimated as follows. In a case where a predetermined material is used, one corresponding to very small crystal domains derived from a skeleton of the material is formed, and the domains fulfill a role as an inorganic filler to achieve a high surface hardness. On the contrary, the crosslink density itself is moderately low, and one like a buffer against the molecular motion exists, which suppresses the thermal expansion/shrinkage.

Further, in the present invention, since the above elastic modulus in tension ratio of the cover coat layer is a predetermined value or above, the deformation immediately after the environmental humidity changes can be made small. The mechanism is estimated as follows.

As described above, the deformation of an optical recording medium when the environmental humidity changes is dominated by the deformation accompanying absorption/desorption of water of the cover coat layer and the resin substrate. In the present invention, a cover coat layer such that the ratio of the elastic modulus in tension upon absorbing moisture to the elastic modulus in tension under normal conditions is within a predetermined range, is formed on the recording and reading layer. A conventional resin material such as a radiation-curable composition is swelled and softened when it absorbs moisture, whereby its elastic modulus is significantly decreased. A material with a great decrease in the elastic modulus provides a small ratio of the elastic modulus in tension upon absorbing moisture to the elastic modulus in tension under normal conditions.

In the present invention, the ratio of the elastic modulus upon absorbing moisture to the elastic modulus under normal conditions of the cover coat layer is high, that is, the elastic modulus is less likely to decrease when the cover coat layer absorbs moisture. Accordingly, the stress of the cover coat layer upon absorbing moisture, which offsets the deformation of the resin substrate upon absorbing moisture, is significant, whereby the deformation can sufficiently be suppressed. Therefore, it is considered that the optical recording medium is less likely to undergo deformation even when the environmental humidity change occurs.

Accordingly, the optical recording medium of the present invention has a sufficient surface hardness, its deformation when the environmental temperature changes is small, and its deformation immediately after the environmental humidity changes is small.

Now, the respective members of the optical recording medium of the present invention will be described.

Cover Coat Layer

First, the cover coat layer to be used for the optical recording medium of the present invention will be described. The cover coat layer to be used in the present invention is provided in contact with the after-mentioned recording and reading layer and usually has a flat circular shape. Such a cover coat layer is formed by a material capable of transmitting a laser beam to be used for recording and reading.

Now, physical properties of the cover coat layer to be used for the optical recording medium of the present invention, materials for the cover coat layer and a formation method will be described.

(Physical Properties of Cover Coat Layer)

The above elastic modulus in tension ratio e of the cover coat layer is usually at least 0.2, preferably at least 0.3, more preferably at least 0.5, particularly preferably at least 0.7. Further, the upper limit is usually at most 1. If the above elastic modulus in tension ratio e is too low, the elastic modulus upon absorbing moisture tends to be low, and when the environmental humidity changes, the deformation of the resin substrate cannot be suppressed, whereby the deformation of the optical recording medium tends to be significant.

Further, the water absorption of the cover coat layer is preferably at most 2 (wt/wt) %, more preferably at most 1.5 (wt/wt) %, furthermore preferably at most 1 (wt/wt) %, particularly preferably at most 0.7 (wt/wt) %. If the water absorption of the cover coat layer is too great, the above elastic modulus in tension ratio e tends to be lower than the above range, whereby the deformation of the optical recording medium accompanying the environmental humidity change is significant in some cases. The water absorption is determined by the following method. A 0.1 mm thickness film is formed, and its initial weight $W_0$ is measured. Then, the film is put in a container filled with pure water for 3 hours at 25° C. for immersion and then taken out, and immediately after the attached pure water is briefly wiped away, the weight W is measured. The water absorption is calculated by determining the weight increase $(W-W_0)$ after immersion relative to the initial weight $W_0$. That is, the water absorption is represented by the following formula:

Water absorption (wt/wt)(%)=$(W-W_0)/W_0 \times 100$

The cover coat layer preferably has a predetermined elastic modulus upon absorbing water to saturation. Specifically, the upper limit is preferably at most 1,100 MPa, more preferably at most 900 MPa, furthermore preferably at most 700 MPa, particularly preferably at most 600 MPa. Further, the lower limit is preferably at least 200 MPa, more preferably at least 250 MPa, furthermore preferably at least 300 MPa, particularly preferably at least 400 MPa. If the elastic modulus upon absorbing water to saturation is too high, the deformation of the cover coat layer will significantly increase when the environmental humidity suddenly changes, and the deformation of the optical recording medium tends to increase. Further, if it is lower than the above range, the deformation of the cover coat layer by absorption/desorption of water tends to be small, and the effect of suppressing the deformation of the resin substrate tends to be small.

Further, a composite layer comprising the above cover coat layer and the after-mentioned hard coat layer in combination preferably has an elastic modulus upon absorbing water to saturation within a predetermined range. The upper limit of the elastic modulus upon absorbing water to saturation of the composite layer is usually at most 1,200 MPa, preferably at most 1,000 MPa, more preferably at most 900 MPa, furthermore preferably at most 800 MPa, particularly preferably at most 700 MPa. Further, the lower limit of the elastic modulus upon absorbing water to saturation of the composite layer is usually at least 300 MPa, preferably at least 350 MPa, more preferably at least 400 MPa, furthermore preferably at least 450 MPa, particularly preferably at least 500 MPa. If the elastic modulus upon absorbing water to saturation is too high, the deformation of the optical recording medium tends to significantly increase when the environmental humidity suddenly changes. On the contrary, if it is too low, the effect of suppressing the deformation of the resin substrate by absorption/desorption of water tends to be small.

The thickness of the cover coat layer is usually at least 10 μm, preferably at least 20 μm, more preferably at least 30 μm, furthermore preferably at least 70 μm, particularly preferably at least 85 μm, and it is usually at most 300 μm, preferably at most 130 μm, more preferably at most 115 μm, furthermore preferably at most 105 μm, whereby a good balance between influences by dust or the like over reading and writing of information and the transmittance.

It is preferred that in general, the cover coat layer is insoluble and infusible in a solvent or the like, it has properties advantageous for an application to an optical member even if it is formed into a thick film, and it is excellent in adhesion and degree of surface cure. Specifically, it preferably has a low degree of optical distortion (low birefringence), a high light beam transmittance, mechanical strength, dimensional stability, high adhesion, a high surface hardness, heat resistance and humidity change resistance at a certain level or more, and a low degree of shrinkage.

Further, it is preferred that the cover coat layer is sufficiently transparent to a laser beam at a wavelength in the vicinity of that to be used for recording and reading of the optical recording medium, and it has properties to protect the after-mentioned recording and reading layer formed on the resin substrate from water and dust and to prevent its deterioration.

The hardness of the cover coat layer is, by the surface hardness by a pencil hardness test in accordance with JIS K5400, usually about 6B, preferably at least 4B, more preferably at least 3B, whereby the surface hardness of the after-mentioned hard coat layer can be increased, and an optical recording medium having excellent abrasion resistance and recording layer protective properties can be obtained.

With respect to the light beam transmittance of the cover coat layer, the light beam transmittance per 0.1 mm of the light path length at 550 nm is usually at least 80%, preferably at least 85%, more preferably at least 89%. There is no upper limit, and the transmittance is preferably as close to 100% as possible. If the light beam transmittance is too low, the transparency of the cover coat layer tends to be poor, and accordingly, errors tend to increase when the information recorded on the optical recording medium is read.

The light beam transmittance of the cover coat layer at a wavelength of light to be used for recording and reading is usually at least 80%, preferably at least 85%, more preferably at least 89%. Within this range, the loss by absorption of the recording/reading light can be minimized. Further, the light beam transmittance is particularly preferably 100%, but it is usually at most 99% in view of performance of materials used. The light beam transmittance may be measured, for example, by means of an ultraviolet/visible absorptiometer model HP8453, manufactured by Hewlett-Packard Development Company, L.P. at room temperature by a known method.

In order that the light beam transmittance of the cover coat layer is within the above range, it is preferred to use ones having a high light beam transmittance as the respective components constituting the after-mentioned radiation-curable composition. Specifically, in order not to decrease the light beam transmittance in the visible region, the amount of impurities such as colored substances and decomposed products in the respective components is preferably small. Further, the amount of catalysts for production of the respective components is preferably small. Further, in order not to decrease the light beam transmittance in the ultraviolet region, it is preferred to select ones having an aliphatic or alicyclic skeleton, containing no an aromatic ring, for the respective components.

Further, it is preferred that the adhesion between the cover coat layer and the after-mentioned recording and reading layer is high, and the adhesion with time is preferably high. Specifically, the ratio of the area in which the cover coat layer and the recording and reading layer are adhered to each other after left in an environment at 80° C. under 80% RH for 100 hours, more preferably for 200 hours, is preferably at least 50% relative to the initial area of adhesion, more preferably at least 80%, particularly preferably at least 100%.

(Material of Cover Coat Layer)

The cover coat layer is a cured product of a radiation-curable composition containing a urethane (meth)acrylate (A) and a (meth)acrylate compound (B) other than the urethane (meth)acrylate (A). The radiation-curable composition may contain a material in addition to the above as the case requires.

Urethane (Meth)Acrylate (A)

In the radiation-curable composition to be used for formation of the cover coat layer, a urethane (meth)acrylate (A) is contained, whereby the deformation of the optical recording medium by the environmental temperature and humidity changes can be made small, and the optical recording medium can have a high surface hardness.

The urethane (meth)acrylate (A) is not particularly limited, and is usually obtained by reacting a compound having a hydroxyl group, a polyisocyanate and a (meth)acrylate having a hydroxyl group.

In the present invention, it is particularly preferred that the urethane (meth)acrylate (A) is a reaction product of a composition containing a polyisocyanate (a1), a diol (a2) having a molecular weight less than 400, a polyol (a3) having a molecular weight of at least 400 and a hydroxyl group-containing (meth)acrylate (a4).

Further, the polyol (a3) having a molecular weight of at least 400 preferably comprises a polyol (a3-1) having a molecular weight of at least 400 and less than 1,500 and a polyol (a3-2) having a molecular weight of at least 1,500.

The molecular weight in the present invention means a number average molecular weight unless otherwise specified.

(Polyisocyanate (a1))

The polyisocyanate is a compound having two or more isocyanate groups in its molecule. The polyisocyanate to be used in the present invention is not particularly limited, and it may, for example, be an aliphatic diisocyanate such as tetramethylene diisocyanate, hexamethylene diisocyanate or trimethylhexamethylene diisocyanate; an alicyclic diisocyanate such as bis(isocyanatomethyl)cyclohexane, cyclohexane diisocyanate, bis(isocyanatocyclohexyl)methane or isophorone diisocyanate; or an aromatic diisocyanate such as tolylene diisocyanate, xylylene diisocyanate, diphenylmethane diisocyanate, m-phenylene diisocyanate or naphthalene diisocyanate. They may be used alone or two or more may be used in an optional ratio in optional combination. Among them, in view of favorable hue of the urethane (meth)acrylate (A) to be obtained, preferred is an alicyclic diisocyanate such as bis(isocyanatomethyl)cyclohexane, cyclohexane diisocyanate, bis(isocyanatocyclohexyl)methane or isophorone diisocyanate.

The molecular weight of the polyisocyanate (a1) is usually at least 100, preferably at least 150 in view of the balance between the strength and the elastic modulus of the cover coat layer. Further, it is usually at most 1,000, preferably at most 500.

The polyisocyanate (a1) is used, in the total amount of the urethane (meth)acrylate (A) and the (meth)acrylate compound (B) other than the urethane (meth)acrylate (A), in an amount of usually at least $2 \times 10^{-4}$ mol/g, preferably at least $6 \times 10^{-4}$ mol/g, and is used in an amount of usually at most $22 \times 10^{-4}$ mol/g, preferably at most $16 \times 10^{-4}$ mol/g.

(Diol (a2) Having a Molecular Weight Less than 400)

The diol having a molecular weight less than 400 is a compound having a molecular weight less than 400 and containing two hydroxyl groups. The diol having a molecular weight less than 400 to be used in the present invention is not particularly limited, but is particularly preferably a diol having two hydroxyl groups connected by carbon.

Specifically, it may, for example, be an alkylene diol such as ethylene glycol, 1,2-propanediol, 1,3-propanediol, 2-methyl-1,3-propanediol, 1,3-butanediol, 1,4-butanediol, 1,5-pentanediol, 2-methyl-1,5-pentanediol, neopentyl glycol, 3-methyl-1,5-pentanediol, 2,3,5-trimethyl-1,5-pentanediol, 1,6-hexanediol, 2-ethyl-1,6-hexanediol, 2,2,4-trimethyl-1,6-hexanediol, 1,8-octanediol, 1,9-nonanediol, 2-methyl-1,8-octanediol, 1,2-dimethylolcyclohexane, 1,3-dimethylolcyclohexane, 1,4-dimethylolcyclohexane or dicyclopentadienyl dimethanol. They may be used alone, or two or more may be used in an optional ratio in an optional combination.

Among them, preferred is a $C_{4-10}$ aliphatic diol, specifically, particularly preferred is 1,4-butanediol, 1,5-pentanediol, 2-methyl-1,5-pentanediol, 1,6-hexanediol, 1,8-octanediol, 1,9-nonanediol, 2-methyl-1,8-octanediol or the like, with which deformation of the optical recording medium is less likely to occur, and the surface hardness of the optical recording medium tends to be high.

The molecular weight of the diol (a2) having a molecular weight less than 400 is preferably at most 250 in view of the balance between the surface hardness and the deformation of the resin substrate by shrinkage on curing, more preferably at most 150, and usually at least 80, preferably at least 100.

Further, the diol (a2) having a molecular weight less than 400 is used, in the total amount of the urethane (meth)acrylate (A) and the (meth)acrylate compound (B) other than the urethane (meth)acrylate (A), in an amount of usually at least $1 \times 10^{-4}$ mol/g, preferably at least $3 \times 10^{-4}$ mol/g and is used in an amount of usually at most $10 \times 10^{-4}$ mol/g, preferably at most $8 \times 10^{-4}$ mol/g.

(Polyol (a3) Having a Molecular Weight of at Least 400)

The polyol (a3) having a molecular weight of at least 400 of the present invention preferably comprises a polyol (a3-2) having a molecular weight of at least 400 and less than 1,500 and a polyol (a3-1) having a molecular weight of at least 1,500.

(Polyol (a3-1) Having a Molecular Weight of at Least 400 and Less than 1,500)

The polyol having a molecular weight of at least 400 and less than 1,500 is a compound having a molecular weight of at least 400 and less than 1,500 and having at least two hydroxyl groups in its molecule.

The polyol having a molecular weight of at least 400 and less than 1,500 may, for example, be a polyether polyol which is a multimer of the diol (a2) having a molecular weight less than 400 (hereinafter sometimes referred to simply as "diol"); a polyester polyol having an ester linkage by the reaction of the diol with a polybasic acid or an ester linkage by ring-opening polymerization of a cyclic ester; or a polycarbonate polyol having a carbonate linkage by the reaction of the diol with a carbonate.

The polyether polyol may, for example, be specifically a multimer of the above diol; a polytetramethylene glycol as a ring-opening polymer of a cyclic ether such as tetrahydrofuran; or an adduct of an alkylene oxide such as ethylene oxide, propylene oxide, 1,2-butylene oxide, 1,3-butylene oxide, 2,3-butylene oxide, tetrahydrofuran or epichlorohydrin to the above diol.

The polyester polyol may, for example, be specifically a reaction product of the diol with a polybasic acid such as maleic acid, fumaric acid, adipic acid, sebacic acid or phthalic acid; or polycaprolactone as a ring-opening polymerized product of a cyclic ester such as caprolactone.

Further, the polycarbonate polyol may, for example, be specifically a reaction product of the diol with an alkylene carbonate such as ethylene carbonate, 1,2-propylene carbonate or 1,2-butylene carbonate, a diaryl carbonate such as diphenyl carbonate, 4-methyldiphenyl carbonate, 4-ethyldiphenyl carbonate, 4-propyldiphenyl carbonate, 4,4'-dimethyldiphenyl carbonate, 2-tolyl-4-tolyl carbonate, 4,4'-diethyldiphenyl carbonate, 4,4'-dipropyldiphenyl carbonate, phenyltoluoyl carbonate, bischlorophenyl carbonate, phenylchlorophenyl carbonate, phenylnaphthyl carbonate or dinaphthyl carbonate, or a dialkyl carbonate such as dimethyl carbonate, diethyl carbonate, di-n-propyl carbonate, diisopropyl carbonate, di-n-butyl carbonate, diisobutyl carbonate, di-t-butyl carbonate, di-n-amyl carbonate or diisoamyl carbonate.

Such polyols may be used alone, or two or more may be used in an optional ratio in optional combination. Among the above polyols, a polyether polyol is preferred, a polyalkylene glycol is more preferred, and polytetramethylene glycol is particularly preferred.

The upper limit of the molecular weight of the polyol (a3-1) having a molecular weight of at least 400 and less than 1,500 is more preferably at most 1,100, furthermore preferably at most 900, particularly preferably at most 800 with a view to improving the surface hardness.

The polyol (a3-1) having a molecular weight of at least 400 and less than 1,500 is used, in the total amount of the urethane (meth)acrylate (A) and the (meth)acrylate (B) other than the urethane (meth)acrylate (A), in an amount of usually at least $0.1 \times 10^{-4}$ mol/g, preferably at least $0.5 \times 10^{-4}$ mol/g, and is used in an amount of usually at most $2.0 \times 10^{-4}$ mol/g, preferably at most $1.3 \times 10^{-4}$ mol/g.

(Polyol (a3-2) having a molecular weight of at least 1,500)

The polyol having a molecular weight of at least 1,500 is a compound having a number average molecular weight of at least 1,500 and having at least two hydroxyl groups in its molecule.

Such a polyol having a molecular weight of at least 1,500 is not particularly limited, and it may, for example, be a polyol as exemplified in the section of the polyol (a3-1) having a molecular weight of at least 400 and less than 1,500. Among them, the polyether polyol is preferred, the polyalkylene glycol is more preferred, and polytetramethylene glycol is particularly preferred. Further, the polyols (a3-2) having a molecular weight of at least 1,500 may be used alone or two or more may be used in an optional ratio in optional combination.

The lower limit of the molecular weight of the polyol (a3-2) having a molecular weight of at least 1,500 is preferably at least 1,900 in view of a small decrease in the elastic modulus upon absorbing water of the cover coat layer.

Further, the polyol (a3-2) having a molecular weight of at least 1,500 is used, in the total amount of the urethane (meth)acrylate (A) and the (meth)acrylate compound (B) other than the urethane (meth)acrylate (A), in an amount of usually at least $0.05 \times 10^{-4}$ mol/g, preferably at least $0.1 \times 10^{-4}$ mol/g, and is used in an amount of usually at most $1 \times 10^{-4}$ mol/g, preferably at most $0.5 \times 10^{-4}$ mol/g.

(Hydroxyl Group-containing (Meth)Acrylate (a4))

The hydroxyl group-containing (meth)acrylate is a compound having both hydroxyl group and (meth)acryloyl group. The hydroxyl group-containing (meth)acrylate is not particularly limited and it may, for example, be hydroxyethyl (meth)acrylate, hydroxypropyl (meth)acrylate, hydroxybutyl (meth)acrylate, an addition reaction product of glycidyl ether with (meth)acrylic acid, or a mono(meth)acrylate of glycol. They may be used alone or two or more may be used in an optional ratio in optional combination.

The molecular weight of the hydroxyl group-containing (meth)acrylate (a4) is preferably at least 40, more preferably at least 80, and is preferably at most 800, more preferably at most 400.

The hydroxyl group-containing (meth)acrylate (a4) is used, in the total amount of the urethane (meth)acrylate (A) and the (meth)acrylate compound (B) other than the urethane (meth)acrylate (A), in an amount of usually at least $2 \times 10^{-4}$ mol/g, preferably at least $6 \times 10^{-4}$ mol/g, and is used in an amount of usually at most $21 \times 10^{-4}$ mol/g, preferably at most $17 \times 10^{-4}$ mol/g.

(Method to Produce Urethane (Meth)Acrylate (A))

The urethane (meth)acrylate (A) can be produced by addition reaction of a composition containing the polyisocyanate (a1), the diol (a2) having a molecular weight less than 400, the polyol (a3-1) having a molecular weight of at least 400 and less than 1,500, the polyol (a3-2) having a molecular weight of at least 1,500 and the hydroxyl group-containing (meth)acrylate (a4).

In the above addition reaction, it is preferred to adjust the amounts of isocyanate groups and hydroxyl groups in the composition containing (a1), (a2), (a3-1), (a3-2) and (a4) to be stoichiometric amounts.

Further, in production of the urethane (meth)acrylate (A), the weight ratio of the polyol (a3-2) having a molecular weight of at least 1,500 to the polyol (a3-1) having a molecular weight of at least 400 and less than 1,500, i.e. (weight of (a3-2))/(weight of (a3-1)) is usually at least 0.05, preferably at least 0.1, and is usually at most 10, preferably at most 7. If this ratio is too low, the elastic modulus upon absorbing water of the cover coat layer tends to decrease. On the contrary, if the ratio is too high, the surface hardness tends to decrease.

Further, the amount of hydroxyl groups in the hydroxyl group-containing (meth)acrylate (a4) to be used for production of the urethane (meth)acrylate (A) is usually at least 20 mol %, preferably at least 40 mol %, and is usually at most 80 mol %, preferably at most 60 mol %, based on the amount of all the hydroxyl groups contained in the diol (a2) having a molecular weight less than 400, the polyol (a3-1) having a molecular weight of at least 400 and less than 1,500, the polyol (a3-2) having a molecular weight of at least 1,500 and the hydroxyl group-containing (meth)acrylate (a4). The molecular weight of the urethane (meth)acrylate (A) to be obtained can be controlled by the above ratio.

The addition reaction of the composition containing the polyisocyanate (a1), the diol (a2) having a molecular weight less than 400, the polyol (a3-1) having a molecular weight of at least 400 and less than 1,500, the polyol (a3-2) having a molecular weight of at least 1,500 and the hydroxyl group-containing (meth)acrylate (a4) can be carried out by any known method. For example, the polyisocyanate (a1), a composition (hereinafter sometimes referred to as a hydroxyl group-containing composition) containing (a2), (a3-1), (a3-2) and (a4) and a mixture containing an addition reaction catalyst are mixed usually at 40° C. or above, preferably at 50° C. or above, and usually at 90° C. or below, preferably at 75° C. or below. The mixing method may be a method of dropwise adding the hydroxyl group-containing composition and the mixture containing an addition reaction catalyst simultaneously or sequentially in the presence of the polyisocyanate (a1).

The addition reaction catalyst may, for example, be preferably dibutyltin laurate, dibutyltin dioctoate, dibutyltin dilaurate or dibutyltin dioctoate, and they may be used alone or two or more may be used in an optional ratio in optional combination.

In production of the urethane (meth)acrylate (A), as described above, one or more components other than (a1), (a2), (a3-1), (a3-2) and (a4) may be contained in an optional ratio in optional combination. Further, since the urethane (meth)acrylate (A) usually has a high viscosity, thus leading to low workability, a low viscosity liquid compound such as the after-mentioned (meth)acrylate may be mixed to decrease the viscosity, thereby to improve workability.

(Properties of Urethane (Meth)Acrylate (A))

The urethane (meth)acrylate (A) is preferably one having high transparency, and it may, for example, be preferably a compound having no aromatic ring. In a case where the urethane (meth)acrylate (A) has an aromatic ring, a radiation-curable composition having an aromatic ring and its cured product may be colored, or even if they are initially not colored, they may be colored or the coloring may be deepened (so-called yellowing) during storage. The reason is considered to be an irreversible change of the structure of a double bond moiety forming the aromatic ring by energy beams. Accordingly, by the urethane (meth)acrylate (A) having a structure having no aromatic ring, the hue will not be deteriorated, and the light beam transmittance will not decrease. The urethane (meth)acrylate (A) having no aromatic ring can be produced by selecting, as the above (a1), (a2), (a3-1), (a3-2) and (a4), ones having no aromatic ring.

In the present invention, the urethane (meth)acrylate (A) is particularly preferably urethane acrylate, which provides excellent surface curing properties as the radiation-curable composition and with which tack is less likely to remain.

The weight average molecular weight of the urethane (meth)acrylate (A) is usually at least 1,000, preferably at least 1,500, in view of the balance between the viscosity and the mechanical properties, and is usually at most 10,000, preferably at most 5,000.

For the urethane (meth)acrylate (A), preferably at least two polyols differing in the molecular weight are used. Whether or not at least two polyols differing in the molecular weight are contained in the urethane (meth)acrylate (A) can be judged by analyzing the molecular weight of the polyol with respect to the urethane (meth)acrylate (A) employing methods of pyrolysis GC-MS, alkali methylated pyrolysis GC-MS, etc in combination. Further, it can also be judged by whether the profile of the molecular weight distribution obtained by carrying out gel permeation chromatography (GPC) analysis has two maximums or not.

(Meth)Acrylate Compound (B) Other than Urethane (Meth) Acrylate (A)

The radiation-curable composition to be used for formation of the cover coat layer contains the (meth)acrylate compound (B) other than the urethane (meth)acrylate (A) (hereinafter sometimes referred to as "(meth)acrylate compound (B)"). The (meth)acrylate compound (B) fulfills a role as a diluent to reduce the viscosity of the urethane (meth)acrylate (A) thereby to make it possible to form a smooth and homogeneous cover coat layer and in addition, has a function to aid development of a high surface hardness.

The (meth)acrylate compound (B) may be a monofunctional (meth)acrylate (b1) and/or a multifunctional (meth) acrylate (b2). The monofunctional (meth)acrylate (b1) and the multifunctional (meth)acrylate (b2) may be used alone or two or more may be used in an optional ratio in optional combination.

The monofunctional (meth)acrylate (b1) may, for example, be a (meth)acrylamide such as N,N-dimethyl (meth)acrylamide; a hydroxyalkyl (meth)acrylate such as hydroxyethyl (meth)acrylate, hydroxypropyl (meth)acrylate or hydroxybutyl (meth)acrylate; or an alicyclic (meth)acrylate such as (meth)acryloyl morpholine, tetrahydrofurfuryl (meth)acrylate, isobornyl (meth)acrylate, cyclohexyl (meth)acrylate or a (meth)acrylate having a tricyclodecane skeleton. Among them, an alicyclic (meth)acrylate is preferred. Further, for example, also preferred is a heterocyclic (meth)acrylate having at least one alicyclic hydrocarbon ring having at least 5 carbon atoms, preferably at least 5 and at most 7 carbon atoms, and having at least one carbon atom substituted by a hetero atom such as a nitrogen atom, an oxygen atom or a sulfur atom.

The heterocyclic (meth)acrylate may, for example, be (meth)acryloyl morpholine, tetrahydrofurfuryl (meth)acrylate, caprolactone-modified tetrahydrofurfuryl (meth)acrylate or 3,4-epoxycyclohexylmethyl (meth)acrylate.

In the present invention, among the above, particularly preferred is an alicyclic (meth)acrylate such as (meth)acryloyl morpholine, tetrahydrofurfuryl (meth)acrylate, isobornyl (meth)acrylate, cyclohexyl (meth)acrylate or a (meth)acrylate having a tricyclodecane skeleton, and particularly preferred is isobornyl (meth)acrylate or dicyclopentadienyl (meth)acrylate which is a (meth)acrylate having a tricyclodecane skeleton, with which the decrease in the elastic modulus upon absorbing water is small.

Further, the multifunctional (meth)acrylate compound (b2) may, for example, be an aliphatic poly(meth)acrylate, an alicyclic poly(meth)acrylate or an aromatic poly(meth)acrylate, and specifically, it may, for example, be polyethylene glycol di(meth)acrylate, 1,2-polypropylene glycol di(meth) acrylate, 1,3-polypropylene glycol di(meth)acrylate, polytetramethylene glycol di(meth)acrylate, 1,2-polybutylene glycol di(meth)acrylate, polyisobutylene glycol di(meth) acrylate, ethylene oxide of a bisphenol such as bisphenol A, bisphenol F or bisphenol S, di(meth)acrylate of an alkylene oxide adduct such as propylene oxide or butylene oxide, a di(meth)acrylate of a hydrogenated derivative of a bisphenol such as bisphenol A, bisphenol F or bisphenol S, a (meth) acrylate having a polyether skeleton such as a di(meth)acrylate of a block or random copolymer of a polyether polyol compound with another compound, or an indefinite multifunctional (meth)acrylate such as a bifunctional (meth)acrylate such as hexanediol di(meth)acrylate, neopentyl glycol di(meth)acrylate, nonanediol di(meth)acrylate, methyloctanediol di(meth)acrylate, decanediol di(meth)acrylate, 2,2-bis[4-(meth)acryloyloxyphenyl]propane, 2,2-bis[4-(2-(meth)acryloyloxyethoxy)phenyl]propane, bis (hydroxymethyl)tricyclo[$5.2.1.0^{2,6}$]decane=di(meth) acrylate, p-bis[β-(meth)acryloyloxyethylthio]xylylene or 4,4'-bis[β-(meth)acryloyloxyethylthio]diphenylsulfone, a trifunctional (meth)acrylate such as trimethylolpropane tris (meth)acrylate, glycerol tris(meth)acrylate or pentaerythritol tris(meth)acrylate, a tetrafunctional (meth)acrylate such as pentaerythritol tetrakis(meth)acrylate, or a pentafunctional or higher functional (meth)acrylate such as dipentaerythritol hexa(meth)acrylate.

Among the above, in view of controllability of the crosslink formation reaction, preferred is a bifunctional (meth)acrylate. The bifunctional (meth)acrylate is preferably an aliphatic poly(meth)acrylate or an alicyclic poly(meth) acrylate, particularly preferably hexanediol di(meth)acrylate, nonanediol di(meth)acrylate or methyloctanediol di(meth) acrylate. Further, for the purpose of suppressing the deformation of the cover coat layer accompanying the environmental temperature change, improving the surface hardness, etc., a trifunctional or higher functional (meth)acrylate may also be preferably used. The trifunctional or higher functional (meth) acrylate may, for example, be the above exemplified trimethylolpropane tris(meth)acrylate, pentaerythritol tris(meth)acrylate or dipentaerythritol hexa(meth)acrylate, or a trifunctional (meth)acrylate having an isocyanurate skeleton.

Among the above, particularly preferred is an alicyclic multifunctional (meth)acrylate such as bis(hydroxymethyl) tricyclo[$5.2.1.0^{2,6}$]decane=di(meth)acrylate, whereby the decrease in the elastic modulus upon absorbing water of the cover coat layer is small.

The lower limit of the preferred content of the urethane (meth)acrylate (A) in the radiation-curable composition to be used for formation of the cover coat layer of the present invention is, based on the total amount of the radiation-curable composition, 10 wt %, preferably 15 wt %, more preferably 30 wt %. Further, the upper limit is 85 wt %, preferably 80 wt %, more preferably 70 wt %. If the content is too low, shrinkage at the time of curing may be significant, whereby the deformation such as warpage of the resin substrate tends to be significant. On the contrary, if the content is too high, the viscosity of the composition will significantly increase.

The preferred lower limit of the content of the monofunctional (meth)acrylate (b1) in the radiation-curable composition to be used for formation of the cover coat layer of the present invention is 10 wt %, preferably 15 wt %, more preferably 30 wt % based on the total amount of the radiation-curable composition. Further, the upper limit is 80 wt %, preferably 60 wt %, more preferably 40 wt %. If the content is too low, the viscosity of the composition tends to be too high. On the contrary, if it is too high, the surface curing properties of the cured product tend to decrease.

The preferred lower limit of the content of the multifunctional (meth)acrylate (b2) in the radiation-curable composition to be used for formation of the cover coat layer of the present invention is 0 wt %, preferably 3 wt %, more preferably 6 wt % based on the total amount of the radiation-curable composition. Further, the upper limit is 30 wt %, preferably 20 wt %, more preferably 15 wt %. If it is too low, the surface hardness of the composition tends to be low. On the contrary, if it is too high, the shrinkage at the time of curing tends to be significant, whereby the deformation such as warpage of the resin substrate tends to be significant.

The molecular weight of the multifunctional (meth)acrylate (b2) is usually preferably at most 300 with a view to improving the curing properties and the surface hardness, more preferably at most 280. On the contrary, it is preferably at least 200, more preferably at least 250 in view of small shrinkage on curing.

In the radiation-curable composition to be used for formation of the cover coat layer, the ratio of the total weight of the polyol (a3-1) having a molecular weight of at least 400 and less than 1,500 and the polyol (a3-2) having a molecular weight of at least 1,500 to the total weight of the urethane (meth)acrylate (A) and the (meth)acrylate compound (B) other than the urethane (meth)acrylate (A), i.e. {(weight of (a3-1))+(weight of (a3-2))}/{(weight of (A))+(weight of (B))} is preferably within a predetermined range. Specifically, the lower limit is usually at least 0.03, preferably at least 0.08, and the upper limit is usually at most 0.3, preferably at most 0.1. If the ratio is too low, the cure shrinkage tends to be too high when the radiation-curable composition is cured, whereby the optical recording medium is deformed in some cases. On the contrary, if the ratio is too high, the surface hardness decreases in some cases.

The radiation-curable composition to be used for formation of the cover coat layer may further contain, as another component, a polymerization initiator, an auxiliary component, etc. to initiate the polymerization reaction which proceeds by radiation (such as active energy rays, ultraviolet rays, electron beams).

(Polymerization Initiator)

As the polymerization initiator, a radical generator which is a compound having properties to generate radicals by light is commonly used, and any known radical generator can be used without significantly impairing the effects of the present invention, and further, a radical generator and a sensitizer may be used in combination.

Such a radical generator may, for example, be specifically benzophenone, 2,4,6-trimethylbenzophenone, 4,4-bis(diethylamino)benzophenone, 4-phenylbenzophenone, methyl o-benzoyl benzoate, thioxanthone, diethylthioxanthone, isopropylthioxanthone, chlorothioxanthone, 2-ethylanthraquinone, t-butylanthraquinone, diethoxyacetophenone, 2-hydroxy-2-methyl-1-phenylpropan-1-one, benzyl dimethyl ketal, 1-hydroxycyclohexyl phenyl ketone, benzoin methyl ether, benzoin ethyl ether, benzoin isopropyl ether, benzoin isobutyl ether, methyl benzoyl formate, 2-methyl-1-[4-(methylthio)phenyl]-2-morpholinopropan-1-one, 2,6-dimethylbenzoyl diphenylphosphine oxide, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)phenylphosphine oxide or 2-hydroxy-1-[4-[4-(2-hydroxy-2-methyl-propionyl)-benzyl]-phenyl]-2-methyl-propan-1-one.

Among them, in view of the high curing rate and with a view to sufficiently increasing the crosslink density, preferred is benzophenone, 2-hydroxy-2-methyl-1-phenylpropan-1-one, 1-hydroxycyclohexyl phenyl ketone, 2,4,6-trimethylbenzoyl diphenylphosphine oxide or 2-hydroxyl-[4-[4-(2-hydroxy-2-methyl-propionyl)-benzyl]-phenyl]-2-methyl-propan-1-one, more preferred is 1-hydroxycyclohexyl phenyl ketone, 2,4,6-trimethylbenzoyl diphenylphosphine oxide or 2-hydroxyl-[4-[4-(2-hydroxy-2-methyl-propionyl)-benzyl]-phenyl]-2-methyl-propan-1-one.

In a case where the optical recording medium of the present invention is to be used for an apparatus using a laser at a wavelength of from 380 to 800 nm as the light source, it is preferred to select the type and the amount of use of the radical generator so that the laser beam necessary for reading is sufficiently transmitted through the cover coat layer. In such a case, it is particularly preferred to use a short wavelength sensitive radical generator which hardly absorbs a laser beam for the radiation-curable composition.

Among the above radical generators, such a short wavelength sensitive radical generator may, for example, be benzophenone, 2,4,6-trimethylbenzophenone, 4-phenylbenzophenone, methyl o-benzoyl benzoate, diethoxyacetophenone, 2-hydroxy-2-methyl-1-phenylpropan-1-one, benzyl dimethyl ketal, 1-hydroxycyclohexyl phenyl ketone, benzoin methyl ether, benzoin ethyl ether, benzoin isopropyl ether, benzoin isobutyl ether or methyl benzoyl formate, and among them, particularly preferred is one having a hydroxyl group such as 1-hydroxycyclohexyl phenyl ketone.

Such radical generators may be used alone or two or more may be used in an optional ratio in optional combination. Further, the amount of use of the radical generator is usually at least 0.1 part by weight, preferably at least 1 part by weight, more preferably at least 2 parts by weight, and is usually at most 10 parts by weight, preferably at most 7 parts by weight, more preferably at most 5 parts by weight, most preferably at most 4 parts by weight, per 100 parts by weight in total of the urethane (meth)acrylate (A) and the (meth)acrylate compound (B) other than the urethane (meth)acrylate (A). If the amount of use is too small, the radiation-curable composition tends not to be sufficiently cured, and on the contrary, if it is too large, the polymerization reaction will suddenly proceed, thus leading to an increase in the optical distortion and in addition, the hue tends to be deteriorated.

Further, together with such a radical generator, a known sensitizer such as methyl 4-dimethylaminobenzoate, ethyl 4-dimethylaminobenzoate, amyl 4-dimethylaminobenzoate or 4-dimethylaminoacetophenone may be used in combination. Such sensitizers may be used alone or two or more may be used in an optional ratio in optional combination.

Particularly when a benzophenone type polymerization initiator is used as the polymerization initiator, the benzophenone type polymerization initiator is used in an amount of preferably at most 2 parts by weight, more preferably at most 1 part by weight, and usually at least 0.5 part by weight, per 100 parts by weight in total of the urethane (meth)acrylate (A) and the (meth)acrylate compound (B) other than the urethane (meth)acrylate (A). If the amount of the benzophenone type polymerization initiator is large, the volatile component in the cover coat layer tends to increase, whereby the thickness in high temperature and high humidity environment decreases in some cases.

In a case where the polymerization reaction is initiated by electron beams as radiation, the above radical generator may be used, but it is preferred not to use the radical generator or another initiator, since sufficient curing is achieved even without use of the polymerization initiator. Further, the polymerization initiator other than the above-described radical generator may, for example, be an oxidizing agent.

Such polymerization initiators may be used alone or two or more may be used in an optional ratio in optional combination.

(Auxiliary Components)

The radiation-curable composition to be used for formation of the cover coat layer may contain an auxiliary components such as an additive as the case requires, without remarkably impairing the effects of the present invention. The auxiliary component may, for example, be specifically a stabilizer such as an antioxidant, a thermal stabilizer or a light absorbing agent; a filler such as glass fibers, glass beads, silica, alumina, zinc oxide, titanium oxide, mica, talc, kaolin, metal fibers or a metal powder; a carbon material (a filler and a carbon material will generically be referred to as an inorganic component) such as carbon fibers, carbon black, graphite, carbon nanotubes or fullerene such as $C_{60}$; a modifier such as an antistatic additive, a plasticizer, a release agent, an antifoaming agent, a leveling agent, an anti-settling agent, a surface active agent or a thixotropy-imparting agent; a coloring agent such as a pigment, a dye or a hue adjuster; a monomer and/or its oligomer; or a curing agent, a catalyst or a curing accelerator necessary for preparation of the inorganic component, etc. These auxiliary components may be used alone or two or more may be used in an optional ratio in optional combination. The content of such an auxiliary component is usually at most 20 wt %, preferably at most 10 wt %, more preferably at most 5 wt % based on the total amount of the radiation-curable composition.

Among them, silica as a filler will be described in detail. The silica to be used for the radiation-curable composition means silicon oxide in general, and the ratio of silicon to oxygen and whether crystalline or amorphous do not matter. The silica particles may, for example, be silica particles in a state dispersed in a solvent, or powdery silica particles; or silica particles derived and prepared from a material such as an alkoxysilane, which are industrially produced. Among them, for use for the radiation-curable composition, preferred are silica particles in a state dispersed in a solvent or silica particles derived and prepared from a material such as an alkoxysilane, which are readily mixed and dispersed.

The particle size of the silica particles is optional, but the number average particle size as measured by observation using TEM (transmission electron microscope) or the like, is preferably at least 0.5 nm, more preferably at least 1 nm, and preferably at most 50 nm, more preferably at most 40 nm, furthermore preferably at most 30 nm, particularly preferably at most 15 nm, more preferably at most 12 nm. The silica particles are preferably ultrafine particles, but if they are too small, the cohesive force of the ultrafine particles will extremely increase, whereby the transparency and the mechanical strength of the cured product tend to extremely decrease, and properties by the quantum effect tend not to be remarkable.

(Method for Forming Cover Coat Layer)

The radiation-curable composition to be used for formation of the cover coat layer is prepared by stirring and uniformly mixing the urethane (meth)acrylate (A), the (meth)acrylate compound (B) other than the urethane (meth)acrylate (A), and the polymerization initiator or the auxiliary component to be used as the case requires, etc. in a state where radiation is shut off. The order of mixing the respective components is not particularly limited, but it is preferred to add a liquid component and/or a solid component having a high viscosity to a low viscosity liquid component, followed by stirring. Further, the polymerization initiator is preferably added finally.

The stirring conditions are not particularly limited. The stirring temperature is usually room temperature, but stirring may be carried out with heating at a temperature of usually at most 90° C., preferably at most 70° C. The stirring rate is usually at least 100 rpm, preferably at least 300 rpm and usually at most 1,000 rpm. The stirring time is usually at least 10 seconds, preferably at least 3 hours, and usually at most 24 hours.

The cover coat layer is obtained by applying the radiation-curable composition to the after-mentioned recording and reading layer and irradiated with radiation (active energy rays or electron beams) to initiate the polymerization reaction, i.e. by so-called "radiation curing". The application method is not limited, and a common method such as a spin coating method may be employed, and in the present invention, the spin coating method is preferred.

The manner of the polymerization reaction of the radiation-curable composition is not limited, and an optional known polymerization manner such as radical polymerization, anionic polymerization, cationic polymerization or coordination polymerization may be employed. Among these polymerization manners, most preferred is radical polymerization. The reason is not clearly understood, but is estimated to be due to homogeneity of the product by homogeneous progress of the initiation of the polymerization reaction in the polymerization system in a short time.

The radiation may be electromagnetic waves (such as gamma rays, X-rays, ultraviolet rays, visible light, infrared rays or microwaves) or particle beams (such as electron beams, alpha rays, neutron beams or atomic beams) which have such a function that they act on the polymerization initiator which initiates a required polymerization reaction, to generate a chemical species which initiates the polymerization reaction. As examples of the preferred radiation in the present invention, ultraviolet rays, visible light and electron beams are preferred, and ultraviolet rays and electron beams are particularly preferred, since an energy and a general purpose light source can be used.

In a case where ultraviolet rays are employed as the radiation, it is preferred to use a photoradical generator which generates radicals by ultraviolet rays as the polymerization initiator. In such a case, a sensitizer may be used in combination as the case requires. The wavelength of the ultraviolet rays is usually at least 200 nm, preferably at least 240 nm, and usually at most 400 nm, preferably at most 350 nm.

As an apparatus to apply ultraviolet rays, a known apparatus such as a high-pressure mercury lamp, a metal halide lamp or an ultraviolet lamp having a structure to generate ultraviolet rays by microwaves may preferably be used. The output of the apparatus is usually at least 10 W/cm, preferably at least 30 W/cm, and usually at most 200 W/cm, preferably at most 180 W/cm. The apparatus is installed with a distance of usually at least 5 cm, preferably at least 30 cm and usually at most 80 cm, preferably at most 60 cm from the object to be irradiated, whereby the degree of photo-deterioration, thermal deterioration, thermal deformation and the like of the irradiated object tends to be low.

The radiation-curable composition can be preferably cured also by electron beams, whereby a cured product excellent in mechanical properties particularly tensile elongation properties will be obtained. In the case of using electron beams, although the light source and irradiation apparatus therefor tend to be expensive, their use is advantageous since it is possible to omit use of the polymerization initiator, and no polymerization inhibition by oxygen will occur, whereby favorable surface hardness will be achieved. The manner of an electron beam irradiation apparatus to be used for irradiation with electron beams is not limited, and a curtain type, an area beam type, a broad beam type or a pulse beam type may, for example, be mentioned. The accelerating voltage at the time of irradiation with electron beams is usually at least 10 kV, preferably at least 100 kV, and usually at most 1,000 kV, preferably at most 200 kV.

The radiation is applied at an irradiation intensity of usually at least 0.1 J/cm$^2$, preferably at least 0.2 J/cm$^2$, and usually at most 20 J/cm$^2$, preferably at most 10 J/cm$^2$, more preferably at most 5 J/cm$^2$, furthermore preferably at most 3 J/cm$^2$, particularly preferably at most 2 J/cm$^2$. The irradiation intensity can be optionally selected within this range depending upon the type of the radiation-curable composition.

The radiation application time is usually at least 1 second, preferably at least 10 seconds, and usually at most 3 hours, and with a view to accelerating the reaction and in view of the productivity, it is preferably at most 1 hour. If the energy of the radiation applied is extremely low or the application time is extremely short, the polymerization tends to be incomplete, whereby no sufficient heat resistance nor mechanical properties of the cover coat layer are obtained in some cases. Further, the energy or the time is extremely in excess, deterioration represented by the deterioration of the hue by light such as yellowing may occur in some cases.

The irradiation with radiation may be carried out in one step or may be dividedly carried out in two or more steps. As the source of radiation, usually a diffusion source of radiation from which the radiation radiates in all directions is employed. The application of radiation is usually carried out by fixing the source of radiation in a state where a disc coated with the radiation-curable composition is fixed or in a state where the disc is carried by a conveyer.

Hard Coat Layer

In the optical recording medium of the present invention, a hard coat layer is formed on the cover coat layer. The type of the hard coat layer is not particularly limited so long as the surface hardness is at least B, and known one as a hard coat layer in a conventional optical recording medium may be used. Further, in the present invention, the surface hardness is at least B, preferably at least HB, more preferably at least F, most preferably at least H. The surface hardness of the hard coat layer in the present invention is the surface harness as measured by a pencil hardness test in accordance with JIS K5400 with respect to the surface of the hard coat layer of the optical recording medium (in a state where the resin substrate, the recording and reading layer, the cover coat layer and the hard coat layer are laminated).

Further, the hard coat layer has a light beam transmittance at a wavelength of 550 nm of preferably at least 80%, more preferably at least 85%, furthermore preferably at least 89%. The measurement of the light beam transmittance is the same as the above-described method for measuring the light beam transmittance of the cover coat layer.

Further, the contact angle to water is preferably at least 900, more preferably at least 1000, whereby the optical recording medium has high stainproof properties. The contact angle against water can be measured by a known method using a contact angle meter or the like.

The thickness of the hard coat layer is usually at least 0.5 μm, preferably at least 1 μm, more preferably at least 1.5 μm. Further, it is usually at most 5 μm, preferably at most 3 μm, more preferably at most 2 μm.

The hard coat layer of the present invention preferably has stainproof properties, i.e. a high contact angle against water.

As a hard coat material having stainproof properties, a radiation-curable composition containing a silicone compound or a fluorine compound as a stainproof properties-imparting agent, and containing a multifunctional (meth)acrylate monomer and an epoxy compound, and an inorganic component such as inorganic nanoparticles, is preferably used. The stainproof properties-imparting agent may, for example, be specifically a silicone compound such as a polymer having a silicone skeleton such as an organopolysiloxane skeleton, a radiation-curable composition having a silicone skeleton and an acrylic group, or a silicone surface active agent; or a fluorine compound such as a polymer containing fluorine atoms, a radiation-curable composition having a fluorine atom and an acrylic group, or a fluorinated surface active agent.

However, in the case of a high density recording medium such as an optical recording medium employing blue laser, the medium is sensitive to stain such as fingerprints, dust or dirt since the laser spot diameter is small. Particularly, a stain containing an organic matter such as fingerprints, which is adhered to the surface of the optical recording medium on a side from which the laser beam enters, may have serious influences such as recording/reading errors by the laser in some cases, and the stain is hardly removed in some cases, and accordingly attention must be paid to such points.

The material for formation of a stainproof hard coat layer to be used in the present invention is basically not particularly limited so long as it is an active energy ray-curable hard coat agent containing a stainproof properties-imparting agent having a fluorine-containing group or a polysiloxane, and it is preferred that active energy ray-curing properties are imparted to the stainproof properties-imparting agent. As specific examples, the following materials may be mentioned.

(1) An active energy ray-curable hard coat agent containing a polysiloxane compound and/or a fluorine compound having an active energy ray-curable group at its terminal, and containing no inorganic component.

(2) An active energy ray-curable hard coat agent containing a polymer having active energy ray-curable groups, and a polysiloxane unit and/or an organic fluorine group unit.

(3) An active energy ray-curable hard coat agent containing a polysiloxane compound and/or a fluorine compound having an active energy ray-curable group at its side chain.

Now, the above (1) to (3) will be described in detail below.

(1) An active energy ray-curable hard coat agent containing a polysiloxane compound and/or a fluorine compound having an active energy ray-curable group at its terminal, and containing no inorganic component, preferably contains as essential components at least 0.01 part by weight and at most 10 parts by weight of the polysiloxane compound and/or the fluorine compound having an active energy ray-curable group at its terminal, at least 88 parts by weight and at most 99.5 parts by weight of a (meth)acrylate composition containing at least 30 wt % of a (meth)acrylate having at least 3 (meth)acryloyl groups in one molecule, and at least 0.1 part by weight and at most 10 parts by weight of a photopolymerization initiator (100 parts by weight in total). Further, an organic solvent in which these essential components are soluble may be added as the case requires to adjust the viscosity, the coating properties and the like.

The polysiloxane compound having an active energy ray-curable group at its terminal is not particularly limited so long as it is a polysiloxane having an acryloyl group or a methacryloyl group at one terminal or at both terminals, and such polysiloxane compounds may be used alone or two or more may be used in an optional ratio in optional combination. Among them, preferred is polydimethylsiloxane having a molecular weight of at least 500 and at most 10,000, having (meth)acryloyl groups at both terminals.

Further, the fluorine compound having an active energy ray-curable group at its terminal may, for example, be a perfluoroalkyl compound, a perfluoroalkylene compound or a perfluoroalkylene polyether compound having an acryloyl group or a methacryloyl group at one terminal or at both terminals, and such compounds may be used alone or two or more may be used in an optional ratio in optional combination.

The (meth)acrylate composition containing at least 30 wt % of a (meth)acrylate having at least 3 (meth)acryloyl groups in one molecule may contain a (meth)acrylate having at least 1 and at most 2 (meth)acryloyl groups in one molecule in addition.

The (meth)acrylate having at least 3 (meth)acryloyl groups in one molecule may, for example, be pentaerythritol trisacrylate, pentaerythritol tetraacrylate, dipentaerythritol pentaacrylate, dipentaerythritol hexaacrylate, ditrimethylolpropane tetraacrylate, a polyester acrylate, a multifunctional urethane acrylate, a polyepoxy acrylate, or triethoxy acrylate having an isocyanurate ring (for example, ARONIX M315, M313 or the like manufactured by TOAGOSEI CO., LTD.) and they may be used alone or two or more may be used in an optional ratio in optional combination. Needless to say, the (meth)acrylate is not limited thereto.

The (meth)acrylate compound having one (meth)acryloyl group in one molecule may, for example, be an alkyl (meth)acrylate such as butyl methacrylate or stearyl acrylate; an alicyclic (meth)acrylate such as cyclohexyl acrylate or isobornyl methacrylate; or a hetero atom-containing cyclic structure-containing acrylate such as tetrahydrofurfuryl acrylate, and in addition, a (meth)acrylate having an aromatic ring, a (meth)acrylate having a hydroxyl group; or a (meth)acrylate having a polyalkylene glycol chain or the like may also be preferably used. They may be used alone or two or more may be used in an optional ratio in optional combination. Needless to say, other than these are not excluded.

The (meth)acrylate compound having two (meth)acryloyl groups in one molecule may, for example, be a di(meth)acrylate of an aliphatic or alicyclic diol such as hexanediol diacrylate; a polyalkylene glycol di(meth)acrylate such as polyethylene glycol diacrylate; a polyester diacrylate; a polyurethane diacrylate; or a bifunctional epoxy acrylate, and they may be used alone or two or more may be used in an optional ratio in optional combination. Needless to say, other than these are not excluded.

The photopolymerization initiator may be widely selected from known ones, and preferred is an alkylphenone type compound (α-hdyroxyacetophenone type, α-aminoacetophenone type, benzyl ketal type), an acylphosphine oxide type compound, an oxime ester compound, an oxyphenyl acetate, a benzoin ether, a phenyl formate or a ketone/amine compound. Specifically preferred is benzoin methyl ether, benzoin ethyl ether, benzoin propyl ether, benzoin butyl ether, diethoxyacetophenone, benzyl dimethyl ketal, 2-hydroxy-2-methylpropiophenone, 1-hydroxycyclohexyl phenyl ketone, benzophenone, 2,4,6-trimethylbenzoin diphenylphosphine oxide, 2-methyl-[4-(methylthio)phenyl]-2-morpholino-1-propanone, 2-benzyl-2-dimethylamino-1-(4-morpholinophenyl)-butan-1-one, methyl benzoyl formate, Michler's ketone, isoamyl N,N-dimethylaminobenzoate, 2-chlorothioxanthone, 2,4-diethylthioxanthone, etc. Two or more of such photopolymerization initiators may suitably be used in combination.

The organic solvent in which the essential components are soluble may, for example, be preferably an alcohol (such as ethanol, isopropanol or isobutanol), a ketone (acetone, methyl ethyl ketone or methyl isobutyl ketone), an alcohol having an alkoxy group (such as methoxy ethanol, ethylene glycol monoethyl ether or propylene glycol monomethyl ether), an ether (such as ethylene glycol dimethyl ether or diethylene glycol dimethyl ether), an ether ester (such as propylene glycol monomethyl ether acetate or 2-ethoxyethyl acetate), an aromatic hydrocarbon (such as toluene or xylene) or an ester (such as ethyl acetate or propyl acetate). They may be used alone or two or more may be used in an optional ratio in optional combination as mixed. It is preferred to suitably select an organic solvent excellent in compatibility and/or uniform dispersibility with other components.

(2) The active energy ray-curable hard coat agent containing a polymer having active energy ray-curable groups, and a polysiloxane unit and/or an organic fluorine group unit preferably contains as essential components at least 0.1 part by weight and at most 20 parts by weight of a polymer having active energy ray-curable groups and a polysiloxane unit and/or an organic fluorine group unit, at least 79.8 parts by weight and at most 99.5 parts by weight of a (meth)acrylate composition containing at least 30 wt % of a (meth)acrylate having at least 3 (meth)acryloyl groups in one molecule, and at least 0.1 part by weight and at most 10 parts by weight of a photopolymerization initiator (100 parts by weight in total). An organic-inorganic hybrid type (meth)acrylate may be added so that inorganic (oxide) particles such as silica are contained within a range not to exceed 50 wt % of the entire (meth)acrylate composition. Further, as the case requires, an organic solvent in which such essential components are soluble may be added so as to adjust the viscosity, the coating properties and the like.

The polymer having active energy ray-curable groups and a polysiloxane unit and/or an organic fluorine group unit is not particularly limited, and it may, for example, be preferably a polymer obtained by copolymerizing dimercaptosilicon and/or a perfluoroalkyl (meth)acrylate with an epoxy group-containing (meth)acrylate as essential components, and adding a carboxylic acid having a (meth)acryloyl group to epoxy groups of the obtained copolymer. However, needless to say, the polymer is not limited thereto.

(3) The active energy ray-curable hard coat agent containing a polysiloxane compound and/or a fluorine compound having an active energy ray-curable group in its side chain preferably contains as essential components at least 0.01 part by weight and at most 10 parts by weight of a polysiloxane compound and/or a fluorine compound having an active energy ray-curable group in its side chain, at least 88 parts by weight and at most 99.5 parts by weight of a (meth)acrylate composition containing at least 30 wt % of a (meth)acrylate having at least 3 (meth)acryloyl groups in one molecule, and at least 0.1 part by weight and at most 10 parts by weight of a photopolymerization initiator (100 parts by weight in total). Further, an organic-inorganic hybrid (meth)acrylate may be added so that inorganic (oxide) particles such as silica are contained within a range not to exceed 50 wt % of the entire (meth)acrylate composition. Further, as the case requires, an organic solvent in which such essential components are soluble may be added to adjust the viscosity, the coating properties and the like.

The polysiloxane compound and/or the fluorine compound having an active energy ray-curable group in its side chain is not particularly limited, and preferred examples include poly(dimethylsiloxane/methyl (meth)acryloyloxyalkyl siloxane), poly(dimethylsiloxane/methyl (meth)acryloyl siloxane) and poly(dimethylsiloxane/methyl (meth)acryloyloxy alkyloxy siloxane) which are polysiloxane compounds having two or more (meth)acryloyl groups per molecule at its side chain) and polyperfluoroalkylene polyether, a (meth)acrylic acid modified product of a perfluoroalkylmercaptane terminal capped polyglycidyl methacrylate oligomer which are fluorine compounds having at least 2 (meth)acryloyl groups per molecule at its side chain. They may be used alone or two or more may be used in an optional ratio in optional combination.

Further, the method of applying the radiation-curable composition for forming a hard coat layer in formation of the hard coat layer is not particularly limited, and for example, a common coating method such as a spin coating method may be employed, and a spin coating method is preferred. Further, the radiation to be employed for curing the radiation-curable composition for forming a hard coat layer is not particularly limited, and for example, the same radiation to be employed for formation of the cover coat layer may be employed.

Resin Substrate

The resin substrate to be used in the present invention is not particularly limited, and known one as a resin substrate of an optical recording medium may optionally be used. The shape of the resin substrate of the optical recording medium is optional, but the substrate is usually formed into a disc shape.

Further, the material of the resin substrate is not particularly limited so long as it is a light transmitting material. That is, it can be formed by an optional material through which light at a wavelength to be used for recording and reading optical information is transmitted. As specific examples, thermoplastic resins such as a polycarbonate resin, a polymethacrylate resin and a polyolefin resin may be used. Among them, a polycarbonate resin is widely used also for CD-ROMs, etc., and it is available at a low cost and is thereby particularly preferred. As the material of the resin substrate, one may be used alone or two or more may be used in an optional ratio in optional combination.

Further, the dimensions of the resin substrate are not limited and are optional. However, the thickness of the resin substrate is usually at least 0.1 mm, preferably at least 0.3 mm, more preferably at least 0.5 mm, and usually at most 20 mm, preferably at most 15 mm, more preferably at most 3 mm. Particularly, a resin substrate with a thickness of about 1.2±0.2 mm is commonly used. Further, the outer diameter of the resin substrate is usually about 120 mm.

Further, the method for producing the resin substrate is not limited and is optional, and for example, the resin substrate can be produced by injection molding of a light transmitting resin.

Recording and Reading Layer

The recording and reading layer to be used in the present invention may have a layer structure according the purpose depending upon a case where the optical recording medium of the present invention is a read-only medium (ROM medium), a case where it is a write once medium on which recording is possible only once, and a case where it is a rewritable medium on which recording and erasing are repeatedly carried out. For example, in a read-only medium, the recording and reading layer is usually constituted as a monolayer containing a metal such as Al, Ag or Au. Further, in a write once medium or a rewritable medium, the recording and reading layer is usually constituted of a reflective layer, a dielectric layer, a recording layer and the like. For example, the recording and reading layer in a rewritable optical recording medium comprises a reflective layer formed from a metal material directly formed on the resins substrate, a recording layer formed from a phase-change material, and two dielectric layers provided to sandwich the recording layer.

The reflective layer may be made of, for example, a material such as Ag, an Ag alloy, Al, an Al alloy, Au or an Au alloy, and they may be used alone or two or more may be used in an optional ratio in optional combination. More preferably, pure Au; an alloy comprising Ag and an element such as Ti, Mg, Au, Cu, Nd or Pd; an alloy comprising Al and an element such as Ta, Ti, Cr or Mo, or the like may be used.

Further, as the dielectric layer, an oxide such as $SiO_2$, ZnO, $Al_2O_3$, $Ta_2O_5$ or $Nb_2O_5$; a nitride such as GeN, SiN, GeN or TaN; a carbide such as SiC; a fluoride such as $MgF_2$ or $CaF_2$; or a sulfide such as ZnS or $Y_2O_2S$ or the like is preferably used. Among them, particularly preferred is ZnS—$SiO_2$, SiN, $Ta_2O_5$ or $Y_2O_2S$ in view of a high film formation rate and a small film stress.

Further, as the recording layer, a material constituted of an inorganic element, a material constituted of an organic compound such as an organic coloring matter, or the like may be used. The material constituted of an inorganic element may be a material containing both a substance which is decomposed by heating and a thermally stable substance. The substance which is decomposed by heating may, for example, be specifically a nitride of at least one element selected from the group consisting of Cr, Mo, W, Fe, Ge, Sn and Sb, or an oxide of at least one element selected from the group consisting of Ir, Au, Ag and Pt. The thermally stable substance may, for example, be specifically a nitride of at least one element selected from the group consisting of Ti, Zr, Hf, V, Nb, Ta, Al and Si, or an oxide of at least one element selected from the group consisting of Zn, Al, Y, Zr, Ti, Nb, Ni, Mg and Si. For the recording layer, they may be used alone or two or more may be used in an optional ratio in optional combination.

Optical Recording Medium

Of the optical recording medium of the present invention, the structure, the application, etc. are not particularly limited so long as it comprises the recording and reading layer, the cover coat layer and the hard coat layer on the resin substrate, and it may suitably has a necessary layer in addition to the above-described layers.

In the present invention, the optical recording medium is preferably a film face incidence type or a next generation high density optical recording medium employing a blue laser.

The next generation high density optical recording medium means an optical recording medium employing a laser beam at a wavelength of from 380 to 800 nm, preferably a laser beam at a wavelength of from 380 to 450 nm.

The optical recording medium of the present invention may be used as a single plate or two or more may be bonded. Further, as the case requires, a hub is attached to the optical recording medium, and the medium may be assembled in a cartridge.

The optical recording medium of the present invention is preferably such that with respect to the optical recording medium after left at rest in an environment at 25° C. for a certain time and left at rest in an environment at 5° C. for one hour, and the optical recording medium after left at rest in an environment at 25° C. for a certain time and then left at rest in an environment at 55° C. for one hour, when the displacement amount in the vertical direction of each medium is measured, the displacement amount is within a predetermined range. When the displacement amount is within a predetermined range, the optical recording medium can be stably used even when the environmental temperature changes.

Now, measurement of the displacement amount in the vertical direction will be described below.

The system of measuring the disc deformation relative to the temperature to be used for measurement of the displacement amount in the vertical direction is schematically shown in FIG. 1. In FIG. 1, an apparatus to detect the deformation of an optical recording medium (hereinafter sometimes referred to as "optical recording medium deformation detector") is installed in a constant temperature chamber, but the system is not limited thereto, and the optical recording medium deformation detector may be formed outside the constant temperature chamber. Further, FIG. 1 is merely expedient to schematically illustrate the system of the optical recording medium deformation detector, and any modification is possible within a range not to depart from the scope of the invention.

Measurement by the optical recording medium deformation detector is carried out by fixing the center portion of an optical recording medium by a fixing weight. The method of fixing the optical recording medium is not particularly limited, and is properly selected depending upon the shape of the optical recording medium. Since the optical recording medium is usually formed into a flat circular shape, a method may be employed wherein a spindle provided in the optical recording medium deformation detector is gotten through a hole at the center of the optical recording medium, and the medium is fixed by the fixing weight.

Then, with respect to the optical recording medium fixed by the fixing weight, the spatial position of the surface of the hard coat layer at a position farthest from the center of the optical recording medium (hereinafter sometimes referred to as "measurement point") in the recording and reading region of the optical recording medium is measured by a displacement sensor. The recording and reading region of the optical recording medium in the present invention means a region to be subjected to recording and reading when the optical recording medium is used in a recording and reading apparatus.

The data obtained by the above measurement is transmitted to a calculator connected to the displacement sensor, and the displacement amount in the vertical direction is calculated from comparison between the reference data and the measurement data. The reference data is data obtained by measuring the spatial position at the measurement point with respect to the optical recording medium at 25° C. Further, the vertical direction in the present invention is a direction vertical to the surface of the hard coat layer of the optical recording medium in an environment at 25° C. Measurement is carried out usually several times, and the maximum value is employed.

A specific method of measuring the displacement amount in the vertical direction using the optical recording medium deformation detector in the present invention will be described below.

First, an optical recording medium is left at rest in a constant temperature chamber set at 25° C. usually for about one hour. On that occasion, the humidity in the constant temperature chamber is usually 45% RH. Further, the method of leaving the medium at rest is not particularly limited so long as no load is applied to the optical recording medium.

Then, the spatial position at the measurement point is measured by the optical recording medium deformation detector installed in the constant temperature chamber or outside the constant temperature chamber. The data thus measured is taken as the reference value.

Then, the temperature in the constant temperature chamber is changed to 55° C. or 5° C., and the optical recording medium is left at rest in the constant temperature chamber and stored for one hour. The conditions such as the humidity in the constant temperature chamber are the same as those at 25° C. The constant temperature chamber set at 25° C. and the constant temperature chamber set at 55° C. or 5° C. may be the same or different.

After the optical recording medium is stored at the above temperature for 1 hour, the spatial position at the measurement point is measured by the optical recording medium deformation detector usually within 5 minutes, and the obtained data is compared with the reference data to calculate the displacement amount (absolute value) at the measurement point in the vertical direction.

As shown in FIG. 1, it is possible to distinguish a case where the optical recording medium is deformed in a concave shape to the cover coat layer and the hard coat layer side by expressing the deformation value by a negative value and a case where the optical recording medium is deformed in a convex shape to the cover coat layer and the hard coat layer side by expressing the deformation value by a positive value. The above positive and negative values may be set reversely.

In the present invention, both the displacement amount (absolute value) in the vertical direction after left at rest at 55° C. for one hour and the displacement amount (absolute value) in the vertical direction after left at rest at 5° C. for one hour, obtained by the above measurement, are usually at most 150 μm, preferably at most 130 μm, more preferably at most 120 μm, whereby the shift in tracking is small even when the environmental temperature of the optical recording medium changes, and the optical recording medium can be stably used.

EXAMPLES

Now, the present invention will be described in further detail with reference to Examples. However, the present invention is by no means thereby restricted to the following Examples within the range not to depart from the scope of the present invention.

(Preparation of Radiation-curable Composition I for a Cover Coat Layer)

Into a four-necked flask equipped with a stirrer, a reflux condenser, a dropping funnel and a thermometer, 147 g of isophorone diisocyanate (a1) and 0.1 g of dibutyltin laurate were put, heated at from 70 to 80° C. in an oil bath and quietly stirred until the temperature became constant. After the temperature became constant, a mixture comprising 25.5 g of 1,4-butanediol (a2), 22.5 g of polytetramethylene glycol (a3-1) (molecular weight: about 650) and 24.7 g of polytetramethylene glycol (a3-2) (molecular weight: about 2,000) was dropwise added from the dropping funnel, followed by stirring for 2 hours while the temperature was maintained at 80° C. The temperature was decreased to 70° C., a mixture comprising 76.7 g of hydroxyethyl acrylate (a4) and 0.1 g of methoquinone was dropwise added from the dropping funnel, and after the dropping was completed, stirring was carried out for 10 hours while the temperature was maintained at 80° C. to prepare an urethane acrylate oligomer (A). To the prepared urethane acrylate oligomer (A), 174.5 g of tetrahydrofurfuryl acrylate (b1) (manufactured by OSAKA ORGANIC CHEMICAL INDUSTRY LTD.), 29 g of 1,6-hexanediol diacrylate (b2) (manufactured by Kyoeisha Chemical Co., Ltd.) and 20 g of 1-hydroxycyclohexyl phenyl ketone (manufactured by Nihon SiberHegner) were added and mixed for 5 hours for dilution to prepare a radiation-curable composition I for a cover coat layer in a uniform liquid state. Further, the amounts of (a3-1) and (a3-2) were as follows.

$$\{\text{weight of } (a3\text{-}2)\}/\{\text{weight of } (a3\text{-}1)\}=1.10$$

{number of mols of (a3-2)}/{number of mols of (a3-1)}=0.36

{(weight of (a3-1)+weight of (a3-2))}/{(weight of (A)+weight of (B))}=0.094

(Preparation of Radiation-curable Composition II for a Cover Coat Layer)

A urethane acrylate oligomer (A) was prepared in the same manner as in the preparation of the radiation-curable composition I for a cover coat layer. To the prepared urethane acrylate oligomer (A), 116.9 g of tetrahydrofurfuryl acrylate (b1) (manufactured by OSAKA ORGANIC CHEMICAL INDUSTRY LTD.), 57.6 g of dicyclopentadienyl acrylate (b2) (manufactured by Hitachi Chemical Company, Ltd.), 29 g of 1,6-hexanediol diacrylate (b2) (manufactured by Kyoeisha Chemical Co., Ltd.) and 20 g of 1-hydroxycyclohexyl phenyl ketone (manufactured by Nihon SiberHegner) were put and mixed for 5 hours for dilution to prepare a radiation-curable composition II for a cover coat layer in a uniform liquid state. The amounts of (a3-1) and (a3-2) are the same as in the radiation-curable composition I for a cover coat layer.

(Preparation of Radiation-curable Composition III for a Cover Coat Layer)

A urethane acrylate oligomer (A) was prepared in the same manner as in the preparation of the radiation-curable composition I for a cover coat layer. To the prepared urethane acrylate oligomer (A), 174.5 g of tetrahydrofurfuryl acrylate (b1) (manufactured by OSAKA ORGANIC CHEMICAL INDUSTRY LTD.), 9.6 g of bis(hydroxymethyl)tricyclo[5.2.1.0$^{2,6}$]decane=diacrylate (b2) (manufactured by SHIN-NAKAMURA CHEMICAL CO., LTD.), 19.4 g of 1,6-hexanediol diacrylate (b2) (manufactured by Kyoeisha Chemical Co., Ltd.) and 20 g of 1-hydroxycyclohexyl phenyl ketone (manufactured by Nihon SiberHegner) were put and mixed for 5 hours for dilution to prepare a radiation-curable composition III for a cover coat layer in a uniform liquid state. The amounts of (a3-1) and (a3-2) are the same as in the radiation-curable composition I for a cover coat layer.

(Preparation of Radiation-curable Composition Iv for a Cover Coat Layer)

A urethane acrylate oligomer (A) was prepared in the same manner as in the preparation of the radiation-curable composition I for a cover coat layer. To the prepared urethane acrylate oligomer (A), 122.2 g of tetrahydrofurfuryl acrylate (b1) (manufactured by OSAKA ORGANIC CHEMICAL INDUSTRY LTD.), 29 g of 1,6-hexanediol diacrylate (b2) (manufactured by Kyoeisha Chemical Co., Ltd.), 52.4 g of isobornyl acrylate (b1) (manufactured by OSAKA ORGANIC CHEMICAL INDUSTRY LTD.) and 20 g of 1-hydroxycyclohexyl phenyl ketone (manufactured by Nihon SiberHegner) were put and mixed for 5 hours for dilution to prepare a radiation-curable composition IV for a cover coat layer in a uniform liquid state. The amounts of (a3-1) and (a3-2) are the same as in the radiation-curable composition I for a cover coat layer.

(Preparation of Radiation-curable Composition V for a Cover Coat Layer)

Into a four-necked flask equipped with a stirrer, a reflux condenser, a dropping funnel and a thermometer, 146.7 g of isophorone diisocyanate (a1) and 0.1 g of dibutyltin laurate were put, heated at from 70 to 80° C. in an oil bath and quietly stirred until the temperature became constant. After the temperature became constant, a mixture comprising 23.8 g of 1,4-butanediol (a2) and 42.9 g of polytetramethylene glycol (a3-1) (molecular weight: about 650) was dropwise added from the dropping funnel, followed by stirring for 2 hours while the temperature was maintained at 80° C. The temperature was decreased to 70° C., a mixture comprising 76.6 g of hydroxyethyl acrylate (a4) and 0.1 g of methoquinone was dropwise added from the dropping funnel, and after the dropping was completed, stirring was carried out for 10 hours while the temperature was maintained at 80° C. to prepare an urethane acrylate oligomer (A). To the prepared urethane acrylate oligomer (A), 195 g of tetrahydrofurfuryl acrylate (b1) (manufactured by OSAKA ORGANIC CHEMICAL INDUSTRY LTD.), 15 g of 1,6-hexanediol diacrylate (b2) (manufactured by Kyoeisha Chemical Co., Ltd.) and 20 g of 1-hydroxycyclohexyl phenyl ketone (manufactured by Nihon SiberHegner) were added and mixed for 5 hours for dilution to prepare a radiation-curable composition V for a cover coat layer in a uniform liquid state. Further, the amounts of (a3-1) and (a3-2) are as follows.

{weight of (a3-2)}/{weight of (a3-1)}=0

{number of mols of (a3-2)}/{number of mols of (a3-1)}=0

{(weight of (a3-1)+weight of (a3-2))}/{(weight of (A)+weight of (B))}=0.086

(Preparation of Radiation-curable Composition VI for a Cover Coat Layer)

Into a four-necked flask equipped with a stirrer, a reflux condenser, a dropping funnel and a thermometer, 158 g of isophorone diisocyanate (a1) and 0.1 g of dibutyltin laurate were put, heated at from 70 to 80° C. in an oil bath and quietly stirred until the temperature became constant. After the temperature became constant, a mixture comprising 28.8 g of 1,4-butanediol (a2) and 23.1 g of polytetramethylene glycol (a3-1) (molecular weight: about 650) was dropwise added from the dropping funnel, followed by stirring for 2 hours while the temperature was maintained at 80° C. The temperature was decreased to 70° C., a mixture comprising 82.6 g of hydroxyethyl acrylate (a4) and 0.1 g of methoquinone was dropwise added from the dropping funnel, and after the dropping was completed, stirring was carried out for 10 hours while the temperature was maintained at 80° C. to prepare an urethane acrylate oligomer (A). To the prepared urethane acrylate oligomer (A), 172.5 g of tetrahydrofurfuryl acrylate (b1) (manufactured by OSAKA ORGANIC CHEMICAL INDUSTRY LTD.), 35 g of 1,6-hexanediol diacrylate (b2) (manufactured by Kyoeisha Chemical Co., Ltd.) and 20 g of 1-hydroxycyclohexyl phenyl ketone (manufactured by Nihon SiberHegner) were added and mixed for 5 hours for dilution to prepare a radiation-curable composition VI for a cover coat layer in a uniform liquid state. Further, the amounts of (a3-1) and (a3-2) are as follows.

{weight of (a3-2)}/{weight of (a3-1)}=0

{number of mols of (a3-2)}/{number of mols of (a3-1)}=0

{(weight of (a3-1)+weight of (a3-2))}/{(weight of (A)+weight of (B))}=0.046

(Preparation of Composition I for a Hard Coat Layer)

99.5 g of dipentaerythritol (hexa/penta)acrylate (tradename: KAYARAD DPHA (manufactured by NIPPON KAYAKU Co., Ltd.)) as a curable composition for a hard coat layer, 0.5 g of TEGO (trademark) Rad2200N (manufactured by Degussa, polydimethylsiloxane having an acrylic group in its side chain) as a water repellent/oil repellent/friction-decreasing agent, 2 g of hydroxycyclohexyl phenyl ketone as a photopolymerization initiator, 50 g of propylene glycol monomethyl ether (PGM) and 103 g of 1-acetoxy-2-methoxypropane (PGMA) were stirred in a dark place at room temperature for 2 hours to prepare a composition I for a hard coat layer (solid content: 40 wt %).

(Preparation of Composition II for a Hard Coat Layer)

90 g of dipentaerythritol (hexa/penta)acrylate (tradename: KAYARAD DPHA (manufactured by NIPPON KAYAKU Co., Ltd.)) as a curable composition for a hard coat layer, 28.57 g of an acrylic acid adduct (35% PGM solution) to a copolymer of methyl methacrylate (MMA), perfluorooctylethyl methacrylate, X-22-167B (polydimethylsiloxane with mercapto at both terminals, manufactured by Shin-Etsu Chemical Co., Ltd.) and glycidyl methacrylate (GMA) in a weight ratio of 25/40/5/30, as a water repellent/oil repellent/friction-decreasing agent, 2 g of hydroxycyclohexyl phenyl ketone as a photopolymerization initiator and PGMA in an amount to bring the solid content to 40 wt % were added and stirred in a dark place at room temperature for 2 hours to prepare a composition II for a hard coat layer.

(Preparation of Composition III for a Hard Coat Layer)

75 of dipentaerythritol (hexa/penta)acrylate (tradename: KAYARAD DPHA (manufactured by NIPPON KAYAKU Co., Ltd.)) as a curable composition for a hard coat layer, 20 g of a dipentaerithritol pentaacrylate adduct to a reaction product of PMA-ST (manufactured by Nissan Chemical Industries, Ltd., 1-acetoxy-2-methoxypropane dispersion of colloidal silica having an average particle size of 12 nm at a concentration of 30%) and KBE9007 (manufactured by Shin-Etsu Chemical Co., Ltd., 3-isocyanatopropyl triethoxysilane) in a weight ratio of 20/1, as an inorganic component, 28.57 g of an acrylic acid adduct (35% PGM solution) to a copolymer of LMA (lauryl methacrylate), perfluorooctylethyl methacrylate, X-22-167B (polydimethylsiloxane with mercapto at both terminals, manufactured by Shin-Etsu Chemical Co., Ltd.) and glycidyl methacrylate (GMA) in a weight ratio of 20/40/3/37, as a water repellent/oil repellent/friction-decreasing agent, 1 g of hydroxycyclohexyl phenyl ketone as a photopolymerization initiator, and a solvent mixture of PGM/PGMA in a weight ratio of 1/1 in an amount to bring the solid content to 35 wt %, were added and stirred in a dark place at room temperature for 2 hours to prepare a composition III (solid content: 35 wt %) for a hard coat layer.

Example 1

The above prepared radiation-curable composition I for a cover coat layer was applied to a 100 mm square fluorine-coated glass plate with a thickness of 3 mm by a spin coater, cured by applying ultraviolet rays at an irradiation intensity of 1 J/cm$^2$ by a high-pressure mercury lamp to obtain a cured coating film with a thickness of 100 μm, and the coating film was carefully peeled. Three such peeled coating films were obtained by repeatedly carrying out the above operation. 10 strip specimens of 10 mm×80 mm were cut out from two of the coating films to obtain samples for measurement of the elastic modulus in tension, and a 80 mm square tetragonal film was cut out from the other coating film to obtain a sample for measurement of the water absorption, and the following evaluations were carried out. The results are shown in Table 2.

(Elastic Modulus in Tension Eb Before Absorbing Water)

The elastic modulus Eb was measured using a Tensilon tensile testing instrument at 25° C. by a method in accordance with JIS K7127.

(Elastic Modulus in Tension Ea after Absorbing Water)

The sample was put in a container filled with 1 L of pure water at 25° C. for 3 hours for immersion and taken out, and immediately after water drops were briefly wiped away, the elastic modulus Ea was measured by a Tensilon tensile testing instrument at 25° C. by a method in accordance with JIS K7127.

The ratio e of the elastic modulus in tension was determined based on the following definition:

The ratio e of the elastic modulus in tension=Ea/Eb (Preparation of Optical Recording Medium)

On the surface of a substrate of an optical recording medium made of polycarbonate having a diameter of 120 mm and a thickness of 1.1 mm, a Ag—Cu—Nd reflective layer with a thickness of 100 nm, a ZnS—SiO$_2$ dielectric layer with a thickness of 25 nm, a Sn—Nb—N recording layer with a thickness of 15 nm and a ZnS—SiO$_2$ dielectric layer with a thickness of 30 nm were formed in this order by sputtering to obtain a recording and reading layer. To the surface of the dielectric layer as the outermost layer of the recording and reading layer, the radiation-curable composition I for a cover coat layer as the material for a cover coat layer was applied by a spin coater so that the thickness would be 100 μm and cured by applying ultraviolet rays with an irradiation amount of 100 mJ/cm$^2$ at a wavelength of 365 nm by a high-pressure mercury lamp (manufactured by HARISON TOSHIBA LIGHTING CORPORATION, TOSCURE 752) to form a cover coat layer. The ultraviolet ray irradiation amount was measured by a UV meter (manufactured by USHIO INC., UIT-250).

Then, to the surface of the cover coat layer, the composition A for a hard coat layer as the material for a hard coat layer was applied by a spin coater and cured by applying ultraviolet rays with an irradiation amount of 400 mJ/cm$^2$ at a wavelength of 365 nm by using a high-pressure mercury lamp (manufactured by JATEC, J-cure 100) to form a hard coat layer with a thickness of 2 μm. Three such optical recording media were obtained by repeatedly carrying out the same operation.

With respect to one of the above prepared optical recording media, the surface hardness on the hard coat surface was evaluated by the following method. The results are shown in Table 2.

(Surface Hardness Evaluation)

The evaluation was carried out by a method in accordance with JIS K5400. Specific operation is shown below.

Pencils (manufactured by MITSUBISHI PENCIL CO., LTD., series UNI, tested by Japan Paint Inspection and Testing Association, for pencil scratch hardness test) with hardness of 4B, 3B, 2B, B, HB, F and H were prepared.

Using a pencil hardness measuring apparatus (manufactured by Shinto Scientific Co., Ltd., Tribogear Type 18), a pencil with a hardness of 4B was attached, and the surface was scratched for 1 cm at a scratch rate of 30 mm/min under a load of 750 gf, whereupon presence or absence of a scratch mark was visually confirmed. When no scratch mark was observed, the pencil was changed to a pencil harder by one scale, and the same operation was carried out.

The results were rated as follows. The definition of the surface hardness of the present invention is shown in Table 1.

TABLE 1

| Hardness of pencil with which scratch mark was confirmed | Surface hardness |
|---|---|
| 4B | 4B or below |
| 3B | 4B |
| 2B | 3B |
| B | 2B |
| HB | B |
| F | HB |

TABLE 1-continued

| Hardness of pencil with which scratch mark was confirmed | Surface hardness |
|---|---|
| H | F |
| Not confirmed with H | H or higher |

The second one among the above prepared optical recording media was subjected to the test to evaluate the disc deformation relative to the humidity by the following method. The results are shown in Table 2.

(Test to Evaluate the Disc Deformation Relative to the Humidity)

Figure 2:
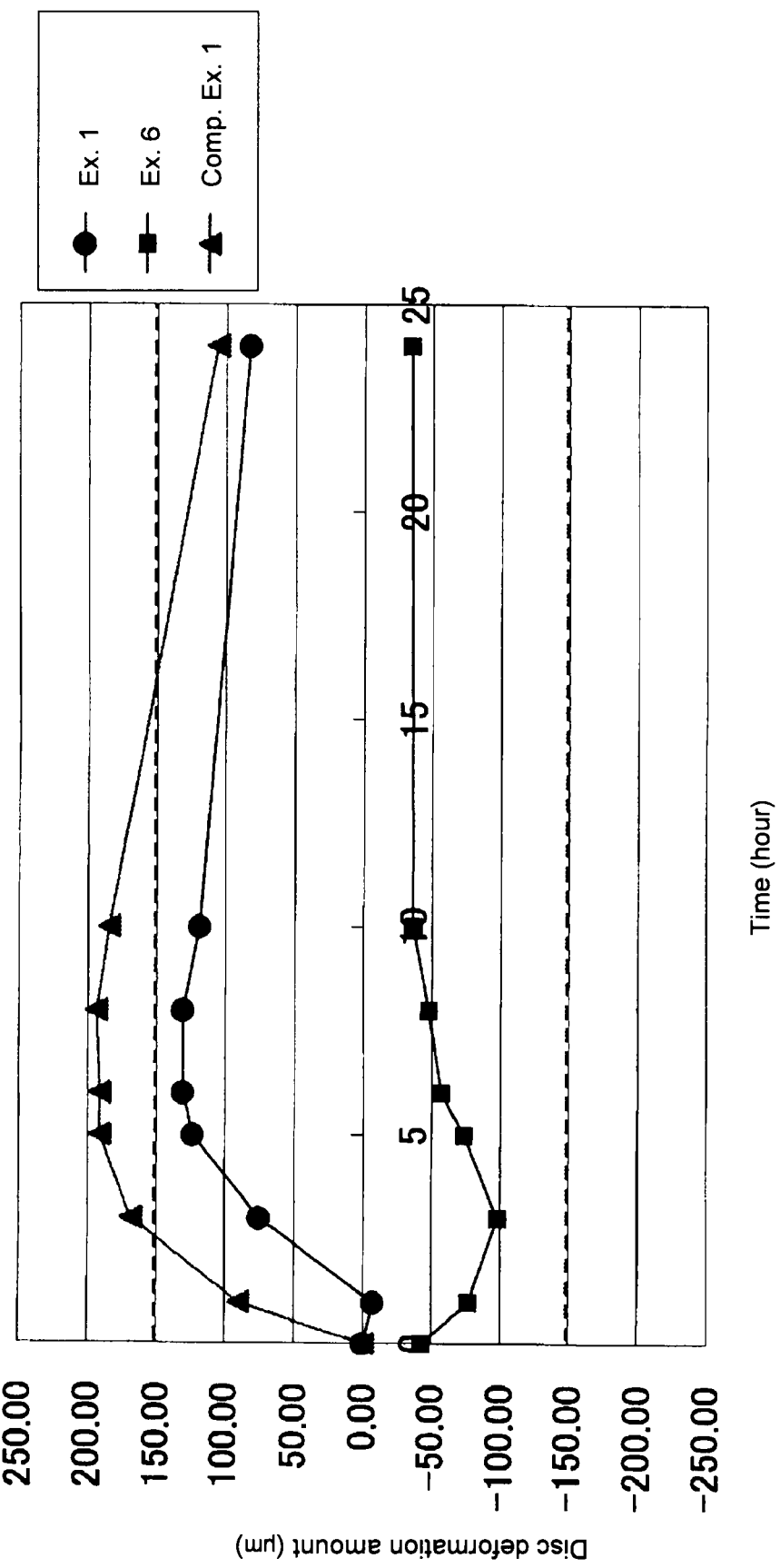
FIG. 2 illustrates graphs showing results of the test to evaluate the disc deformation relative to the humidity in Examples 1 and 6 and Comparative Example 1.

The optical recording medium sample was left at rest in a constant temperature and humidity chamber and maintained for 100 hours while the temperature and the humidity in the constant temperature and humidity chamber were set at 25° C. under 90% RH, respectively. Then, the disc was taken out, and the displacement amount in the direction vertical to the disc was measured using a displacement sensor (manufactured by KEYENCE CORPORATION, LT-9010) in an environment at a temperature of 25° C. under 45% RH as the disc deformation value. Measurement was carried out 0 hour later, 1 hour later, 3 hours later, 5 hours later, 6 hours later, 8 hours later, 10 hours later and 24 hours later and the change with time was recorded. The graph illustrating the disc deformation value is shown in FIG. 2. The disc deformation value when the disc deformed in a concave shape to the hard coat layer side is expressed by a negative value, and the disc deformation value when the disc deformed in a convex shape to the hard coat layer side is expressed by a positive value.

As shown in FIG. 2, the maximum of the disc deformation value was observed 6 to 8 hours later, and the deformation value was 131 μm. This value is shown in Table 2 as the maximum absolute value of the deformation relative to the humidity. When the absolute value of the deformation value is higher than 150 μm, no appropriate working distance when a lens of NA=0.85 with an aperture of 3 mm which is a typical lens is used can be secured, and such a case is judged to be "x", and the other cases were judged to be "○".

The third one among the above prepared optical recording media was subjected to the test to evaluate the disc deformation relative to the humidity by the following method. The results are shown in Table 2.

(Test to Evaluate the Disc Deformation Relative to the Temperature)

On the top surface of a casing of a disc drive (CD-ROM drive manufactured by NEC Corporation, model PCCD60D), a 40 mm square window was formed, and a displacement sensor (manufactured by KEYENCE CORPORATION, LT-9010) was fixed above the window to prepare a disc deformation detecting unit which can detect the deformation of a disc in the vertical direction at a position of 58 mm from the center of the disc when the disc is inserted in the disc drive in real time and output the data to a calculator. This unit was installed in the chamber of a constant temperature chamber (Constant temperature chamber Cosmopia, model EC-10HHP, manufactured by Hitachi Ltd.). This system is schematically shown in FIG. 1. As shown in FIG. 1, the deformation value when the disc was deformed in a concave shape to the cover coat layer/hard coat layer side is expressed by a negative value, and the deformation value when the disc was deformed in a convex shape to the cover coat layer/hard coat layer side is expressed by a positive value.

One of the above prepared optical recording media was inserted in the disc drive, the constant temperature chamber was closed, and the temperature and the humidity in the constant temperature chamber was set at 25° C. under 45% RH, and such a state was maintained for 20 minutes, whereupon the deformation of the disc was measured. The value of the deformation was regarded as the reference deformation value.

Then, the temperature in the constant temperature chamber was set at 55° C., and the disc was maintained for one hour, whereupon the deformation of the disc was measured. The difference between the deformation value and the reference value was recorded as the deformation value at high temperature.

Then, the temperature was set at 25° C. and the disc was maintained for 3 hours, and then the temperature in the constant temperature chamber was set at 5° C. and the disc was maintained for one hour, whereupon the disc deformation value was measured. The difference between the deformation value and the reference value was recorded as the deformation value at low temperature.

Figure 3:
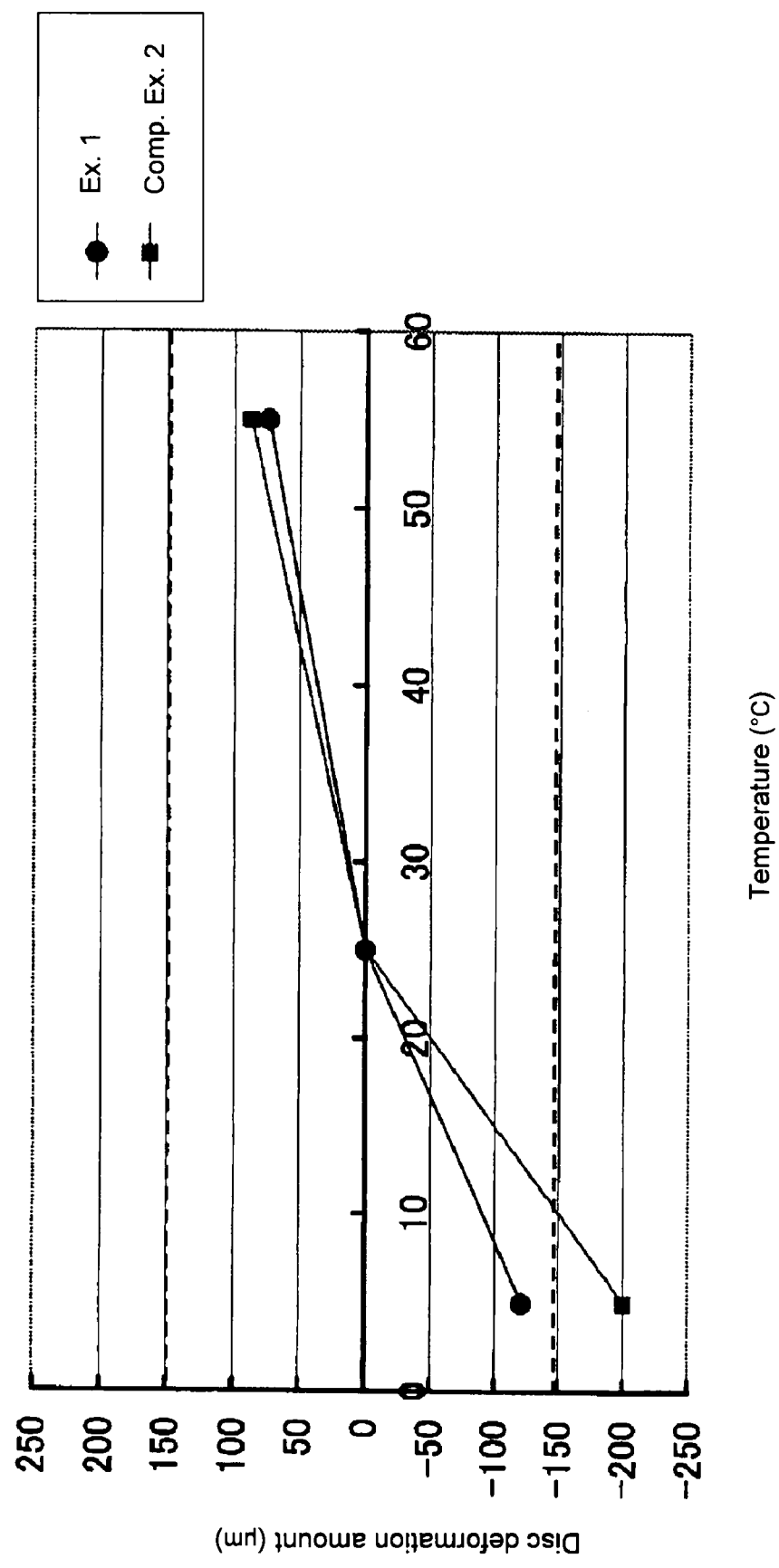
FIG. 3 illustrates graphs showing the results of the test to evaluate the disc deformation relative to the temperature in Example 1 and Comparative Example 2.

The deformation value at high temperature and the deformation value at low temperature were plotted in FIG. 3 with the reference deformation value being a deformation value of 0. As shown in FIG. 3, the deformation value at high temperature was positive, and the deformation value at low temperature was negative. The higher one of the absolute values of the deformation value at high temperature and the deformation value at low temperature was shown in Table 2 as the maximum absolute value of the deformation relative to the temperature.

When the absolute value of the deformation value is higher than 150 μm, no appropriate working distance when a lens of NA=0.85 with an aperture of 3 mm which is a typical lens is used can be secured, and such a case is judged to be "x", and the other cases were judged to be "○".

Example 2

The same operation as in Example 1 was carried out except that the radiation-curable composition I for a cover coat layer was used as the material for a cover coat layer, and the composition II for a hard coat layer was used as the material for hard coat. The surface hardness of the hard coat, Eb, Ea, e and the water absorption of the cover coat layer, and the maximum absolute value of the deformation relative to the humidity and the maximum absolute value of the deformation relative to the temperature of the optical recording medium are shown in Table 2.

Example 3

The same operation as in Example 1 was carried out except that the radiation-curable composition I for a cover coat layer was used as the material for a cover coat layer, and the composition II for a hard coat layer was used as the material for hard coat. The surface hardness of the hard coat, Eb, Ea, e and the water absorption of the cover coat layer, and the maximum absolute value of the deformation relative to the humidity and the maximum absolute value of the deformation relative to the temperature of the optical recording medium are shown in Table 2.

Example 4

The same operation as in Example 1 was carried out except that the radiation-curable composition II for a cover coat layer was used as the material for a cover coat layer, and the composition I for a hard coat layer was used as the material for hard coat. The surface hardness of the hard coat, Eb, Ea, e and the water absorption of the cover coat layer, and the maximum absolute value of the deformation relative to the humidity and the maximum absolute value of the deformation relative to the temperature of the optical recording medium are shown in Table 2.

Example 5

The same operation as in Example 1 was carried out except that the radiation-curable composition III for a cover coat layer was used as the material for a cover coat layer, and the composition I for a hard coat layer was used as the material for hard coat. The surface hardness of the hard coat, Eb, Ea, e and the water absorption of the cover coat layer, and the maximum absolute value of the deformation relative to the humidity and the maximum absolute value of the deformation relative to the temperature of the optical recording medium are shown in Table 2.

Example 6

The same operation as in Example 1 was carried out except that the radiation-curable composition IV for a cover coat layer was used as the material for a cover coat layer, and the composition I for a hard coat layer was used as the material for hard coat. The surface hardness of the hard coat, Eb, Ea, e and the water absorption of the cover coat layer, and the maximum absolute value of the deformation relative to the humidity and the maximum absolute value of the deformation relative to the temperature of the optical recording medium are shown in Table 2. In the test to evaluate the disc deformation relative to the humidity, as shown in FIG. 2, the minimum value of the deformation was observed 3 hours later, and the deformation value was −98 μm. The absolute value of 98 μm was shown in Table 2.

Comparative Example 1

The same operation as in Example 1 was carried out except that the radiation-curable composition V for a cover coat layer was used as the material for a cover coat layer, and the composition I for a hard coat layer was used as the material for hard coat. The surface hardness of the hard coat, Eb, Ea, e and the water absorption of the cover coat layer, and the maximum absolute value of the deformation relative to the humidity and the maximum absolute value of the deformation relative to the temperature of the optical recording medium are shown in Table 2. In the test to evaluate the disc deformation relative to the humidity, as shown in FIG. 2, the maximum value of the deformation was observed 8 hours later, and the deformation value was 194 μm.

Comparative Example 2

The same operation as in Example 1 was carried out except that the radiation-curable composition VI for a cover coat layer was used as the material for a cover coat layer, and the composition I for a hard coat layer was used as the material for hard coat. The surface hardness of the hard coat, Eb, Ea, e and the water absorption of the cover coat layer, and the maximum absolute value of the deformation relative to the humidity and the maximum absolute value of the deformation relative to the temperature of the optical recording medium are shown in Table 2. In the test to evaluate the disc deformation relative to the humidity, the maximum value of the deformation was observed 8 hours later, and the deformation value was 177 μm. In the test to evaluate the disc deformation relative to the temperature, the deformation value at low temperature was so great as −200 μm as shown in FIG. 3.

TABLE 2

|  | Surface hardness | Eb (MPa) | Ea (MPa) | e | Water absorption (%) | Maximum absolute value of the deformation relative to the humidity (μm) | Judgment on the humidity characteristics | Maximum absolute value of the deformation relative to the temperature (μm) | Judgment on the temperature characteristics |
|---|---|---|---|---|---|---|---|---|---|
| Ex. 1 | HB | 1250 | 430 | 0.34 | 1.5 | 131 | ○ | 121 | ○ |
| Ex. 2 | HB | 1250 | 430 | 0.34 | 1.5 | 124 | ○ | 120 | ○ |
| Ex. 3 | F | 1250 | 430 | 0.34 | 1.5 | 130 | ○ | 128 | ○ |
| Ex. 4 | HB | 1300 | 650 | 0.50 | 0.9 | 135 | ○ | 123 | ○ |
| Ex. 5 | HB | 1280 | 460 | 0.36 | 1.2 | 124 | ○ | 124 | ○ |
| Ex. 6 | F | 1350 | 950 | 0.70 | 0.6 | 98 | ○ | 135 | ○ |
| Comp. Ex. 1 | HB | 1350 | 260 | 0.19 | 1.6 | 194 | X | 138 | ○ |
| Comp. Ex. 2 | F | 1500 | 290 | 0.19 | 1.6 | 177 | X | 200 | X |

(Evaluation)

As shown in Table 2, with respect to the optical recording media of the present invention in Examples 1 to 6, the maximum absolute value of the deformation relative to the humidity and the maximum absolute value of the deformation relative to the temperature are preferred values, thus indicating excellent humidity resistance and temperature resistance. Further, the surface hardness is also sufficient.

On the other hand, with respect to the optical recording medium in Comparative Example 1, the maximum absolute value of the deformation relative to the humidity was great, thus indicating insufficient humidity resistance. Further, in Comparative Example 2, the maximum absolute value of the deformation relative to the humidity and the maximum absolute value of the deformation relative to the temperature were great, thus indicating insufficient humidity resistance and temperature resistance.

INDUSTRIAL APPLICABILITY

The optical recording medium of the present invention can cope with the environmental temperature and humidity changes and is also excellent in abrasion resistance and the protective properties of the recording cover coat layer. Accordingly, the present invention is suitably applicable to an optical recording medium including a next generation high density optical recording medium such as a Blu-Ray Disc.

The entire disclosures of Japanese Patent Application No. 2007-215933 filed on Aug. 22, 2007, Japanese Patent Application No. 2007-215934 filed on Aug. 22, 2007 and Japanese Patent Application No. 2007-216256 filed on Aug. 22, 2007 including specifications, claims, drawings and summaries are incorporated herein by reference in their entireties.

The invention claimed is:

1. An optical recording medium comprising a resin substrate, a recording and reading layer, a cover coat layer which is a cured product of a radiation-curable composition comprising a urethane (meth)acrylate (A) and a (meth)acrylate compound (B) other than the urethane (meth)acrylate (A), and a hard coat layer having a surface hardness of at least B in this order, wherein the cover coat layer has a ratio of at least 0.20 where the ratio is defined by an elastic modulus in tension upon absorbing water to saturation over an elastic modulus in tension at 25° C. under a humidity of 45% before absorbing water.

2. The optical recording medium according to claim 1, wherein the water absorption of the cover coat layer is at most 2 (wt/wt) % at 25° C.

3. The optical recording medium according to claim 1, wherein for the optical recording medium left at rest in an environment at 25° C. for a certain time and then left at rest in an environment at 5° C. for one hour, and for the optical recording medium left at rest in an environment at 25° C. for a certain time and then left at rest in an environment at 55° C. for one hour, when a displacement amount in the direction vertical to the surface of the resin substrate at a position farthest from the center in the recording and reading region of each optical recording medium is measured, the displacement amount is at most 150 μm.

4. The optical recording medium according to claim 1, wherein the (meth)acrylate compound (B) other than the urethane (meth)acrylate (A) is at least one of a monofunctional (meth)acrylate (b1) and a multifunctional (meth)acrylate (b2).

5. The optical recording medium according to claim 1, wherein the surface hardness of the hard coat layer is at least HB; the cover coat layer is a cured product of a radiation-curable composition comprising the urethane (meth)acrylate (A) which is a reaction product of a composition comprising a polyisocyanate (a1), a diol (a2) having a molecular weight less than 400, a polyol (a3) having a molecular weight of at least 400 and a hydroxyl group-containing (meth)acrylate (a4), and the monofunctional (meth)acrylate (b1) and the multifunctional (meth)acrylate (b2); the elastic modulus upon absorbing water to saturation of the cover coat layer is within a range of from 200 MPa to 1,100 MPa; and the thickness of the cover coat layer is within a range of from 70μm to 105 μm.

6. The optical recording medium according to claim 5, wherein the cover coat layer is a cured product of a radiation-curable composition comprising the urethane (meth)acrylate (A), the monofunctional (meth)acrylate (b1) and the multifunctional (meth)acrylate (b2), and contents of the respective components are such that (A): 10 to 85 wt %, (b1): 10 to 80 wt %, and (b2): 0 to 30 wt %.

7. The optical recording medium according to claim 5, wherein the polyol (a3) having a molecular weight of at least 400 comprises a polyol (a3-1) having a molecular weight of at least 400 and less than 1,500 and a polyol (a3-2) having a molecular weight of at least 1,500.

8. The optical recording medium according to claim 5, wherein the polyol (a3) having a molecular weight of at least 400 is a polyether polyol.

9. The optical recording medium according to claim 5, wherein the diol (a2) having a molecular weight less than 400 is a diol having two hydroxyl groups connected by carbon.

10. The optical recording medium according to claim 4, wherein at least one of the monofunctional (meth)acrylate (b1) and the multifunctional (meth)acrylate (b2) is an alicyclic (meth)acrylate.

11. The optical recording medium according to claim 5, wherein the multifunctional (meth)acrylate (b2) is an aliphatic multifunctional (meth)acrylate.

12. A Blu-ray Disc comprising the optical recording medium according to claim 1.

* * * * *